United States Patent [19]
Nishimura

[11] Patent Number: 5,719,829
[45] Date of Patent: Feb. 17, 1998

[54] MAGNETOOPTICAL RECORDING MEDIUM ALLOWING SUPER-RESOLUTION, AND INFORMATION REPRODUCTION METHOD USING THE MEDIUM

[75] Inventor: Naoki Nishimura, Tokyo, Japan

[73] Assignee: Canon Kabushiki Kaisha, Tokyo, Japan

[21] Appl. No.: 631,884

[22] Filed: Apr. 16, 1996

Related U.S. Application Data

[63] Continuation of Ser. No. 333,319, Nov. 1, 1994, abandoned.

[30] Foreign Application Priority Data

Nov. 5, 1993 [JP] Japan ................................. 5-276942

[51] Int. Cl.$^6$ ........................................................ G11B 11/00
[52] U.S. Cl. ........................ 369/13; 360/59; 428/694 EC
[58] Field of Search ......................... 369/13, 14, 275.2, 369/275.1, 283, 284, 286, 288; 360/59, 114; 365/122; 428/694 ML, 694 EC, 694 SC, 494 RE

[56] References Cited

U.S. PATENT DOCUMENTS

| | | | |
|---|---|---|---|
| 4,878,132 | 10/1989 | Aratani et al. | 369/13 X |
| 4,955,007 | 9/1990 | Aratani et al. | 369/13 |
| 5,143,798 | 9/1992 | Fujii | 369/275.2 X |
| 5,239,524 | 8/1993 | Sato et al. | 369/13 |
| 5,428,585 | 6/1995 | Hirokane et al. | 369/13 |
| 5,461,595 | 10/1995 | Machida | 369/13 |
| 5,512,366 | 4/1996 | Nakaki et al. | 369/13 X |

FOREIGN PATENT DOCUMENTS

| | | |
|---|---|---|
| 352548 | 1/1990 | European Pat. Off. . |
| 492553 | 7/1992 | European Pat. Off. . |
| 536780 | 4/1993 | European Pat. Off. . |
| 545690 | 6/1993 | European Pat. Off. . |
| 586175 | 3/1994 | European Pat. Off. . |
| 4313833 | 11/1992 | Japan . |
| 5342677 | 3/1994 | Japan . |

*Primary Examiner*—Ali Neyzari
*Attorney, Agent, or Firm*—Fitzpatrick, Cella, Harper & Scinto

[57] ABSTRACT

A magnetooptical recording medium includes a reproduction layer, a first recording layer and a second recording layer. The reproduction layer is a perpendicular magnetic film in both a state of room temperature and a state of temperature rise. In the first and second recording layers, sub lattice magnetic moments of the same kinds of elements constituting the first and second recording layers are oriented in opposite directions. In reproducing operation, an initialization magnetic field is applied to a portion of the recording medium other than a light beam irradiated portion. A direction of magnetization of the reproduction layer is oriented in a stable direction with respect to magnetization of the first recording layer by an exchange coupling effect in a region at a temperature not less than a middle temperature in the irradiated portion. The direction of magnetization of the reproduction layer is oriented in a direction of the initialization magnetic field in a low-temperature region. Reproduction of information is effected by detecting a magnetooptical change in light reflected by the recording medium.

11 Claims, 17 Drawing Sheets

TEMPERATURE DISTRIBUTION IN TRACK CENTER

TEMPERATURE DISTRIBUTION IN TRACK CENTER

TEMPERATURE DISTRIBUTION IN TRACK CENTER

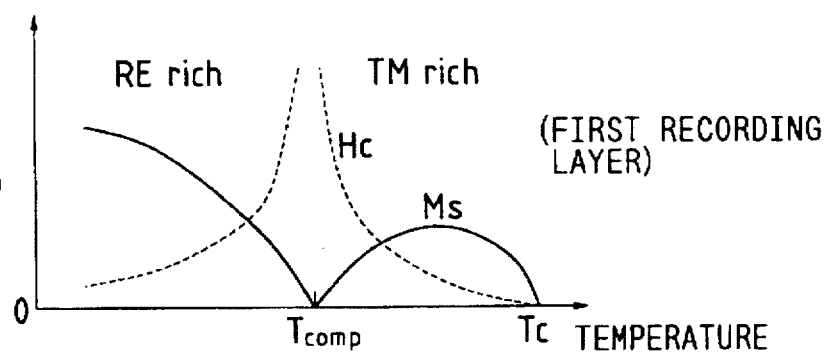
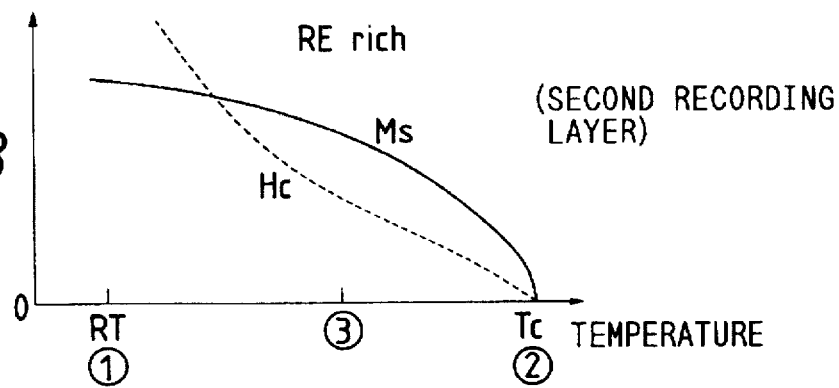
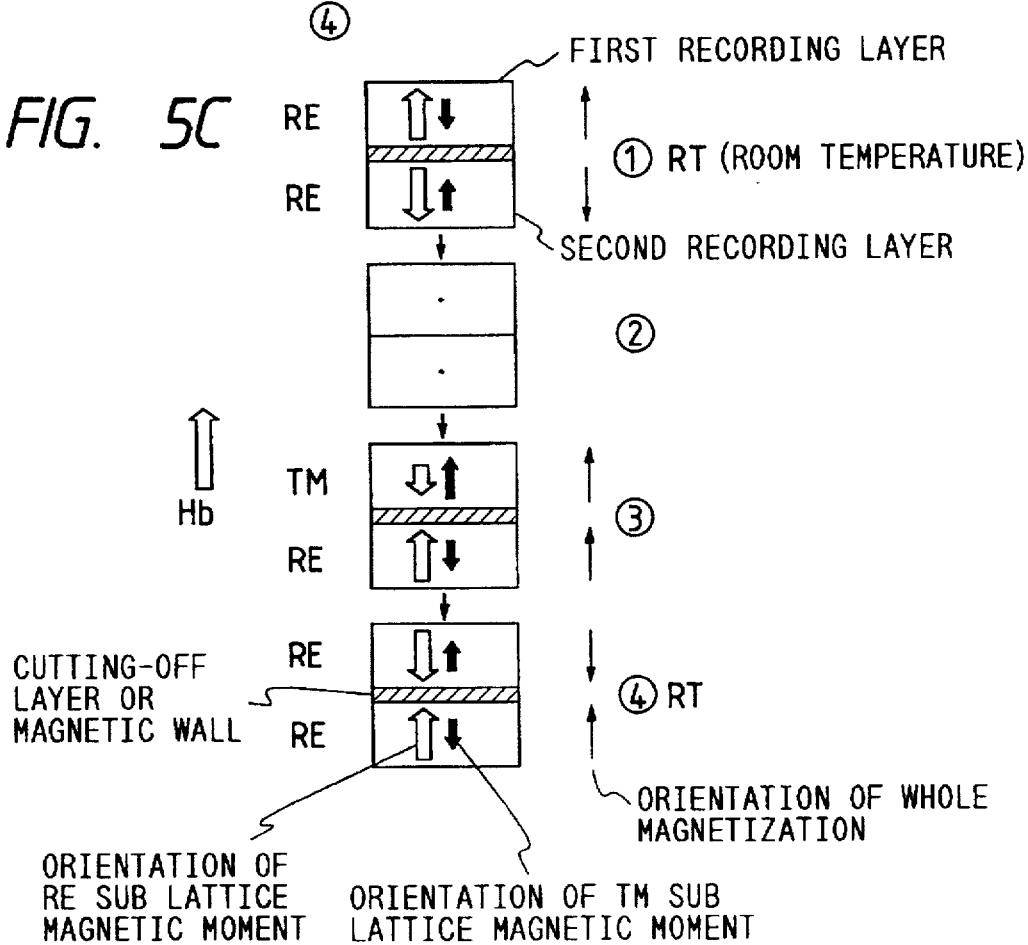

TEMPERATURE DISTRIBUTION
IN TRACK CENTER

TEMPERATURE DISTRIBUTION
IN TRACK CENTER

- REPRODUCTION LAYER
- FIRST RECORDING LAYER
- SECOND RECORDING LAYER

- REPRODUCTION LAYER
- FIRST RECORDING LAYER
- INTERMEDIATE LAYER
- SECOND RECORDING LAYER

- REPRODUCTION LAYER
- FIRST RECORDING LAYER
- SECOND RECORDING LAYER
- DIELECTRIC LAYER
- REFLECTIVE LAYER

- REPRODUCTION LAYER
- FIRST RECORDING LAYER
- SECOND RECORDING LAYER
- REFLECTIVE LAYER

5,719,829

MAGNETOOPTICAL RECORDING MEDIUM ALLOWING SUPER-RESOLUTION, AND INFORMATION REPRODUCTION METHOD USING THE MEDIUM

This application is a continuation of application Ser. No. 08/333,319, filed Nov. 1, 1994, now abandoned.

BACKGROUND OF THE INVENTION

1. Field of the Invention

The present invention relates to a magnetooptical recording medium which is subjected to recording/reproduction of information by means of a laser beam by utilizing a magnetooptical effect, and a magnetooptical reproduction method which can realize a high-density medium.

2. Related Background Art

For use in a rewritable high-density recording method, a magnetooptical recording medium, on which information is recorded by writing a magnetic domain in a magnetic thin film using heat energy of a semiconductor laser, and from which the recorded information is read out using a magnetooptical effect, has received a lot of attention. In recent years, a demand for attaining a large-capacity recording medium by increasing the recording density of such a magnetooptical recording medium has increased.

The linear recording density of an optical disk such as a magnetooptical recording medium largely depends on the laser wavelength of a reproduction optical system and the numerical aperture of an objective lens. More specifically, since the diameter of a beam waist is determined when a laser wavelength λ of the reproduction optical system and a numerical aperture NA of the objective lens are determined, the minimum resolvable mark period is about λ/2NA.

On the other hand, the track density is mainly limited by crosstalk. The crosstalk is mainly determined by the distribution (profile) of a laser beam on the medium surface, and is expressed by a function of λ/2NA as in the mark period.

Therefore, in order to realize a high density in a conventional optical disk, the wavelength of a laser in the reproduction optical system must be shortened, and the numerical aperture NA of the objective lens must be increased. However, it is not easy to shorten the wavelength of the laser in terms of problems associated with efficiency of the element, generation of heat, and the like. On the other hand, when the numerical aperture of the objective lens is increased, the distance between the lens and the disk becomes too small, and a mechanical problem such as collision occurs. For this reason, a super-resolution technique for increasing the recording density by modifying the structure of the recording medium or the method of reading the medium has been developed.

For example, Japanese Laid-Open Patent Application No. 3-93056 attempts to increase the recording density by a super-resolution technique using a magnetic multi-layered film medium. In this method, as shown in, e.g., FIGS. 1A to 1C, a light spot 7 is irradiated onto a medium (FIG. 1A) which comprises at least a reproduction layer 1 and a recording layer 3 and is moving at a given linear velocity (in a moving direction 8), magnetic coupling between the reproduction layer 1 and the recording layer 3 in a high-temperature portion (T>Tm) in the temperature distribution (FIG. 1C) of the medium formed upon irradiation of the light spot is cut off by arranging, e.g., an intermediate layer 2 having a low Curie temperature, and the direction of magnetization of the reproduction layer 1 in the magnetic coupling cut-off portion is aligned in one direction to mask a portion of magnetic domain information in the recording layer in the light spot 7 (FIG. 1A), thereby realizing reproduction of a signal having a period equal to or smaller than the diffraction light of light.

Also, for example, Japanese Laid-Open Patent Application No. 3-93058 attempts to increase the recording density using a medium which is basically constituted by a reproduction layer and a recording layer. In this method, as shown in, e.g., FIGS. 2A to 2C, in a medium (FIG. 2B) which is moving at a given linear velocity (in a moving direction 8), comprises a reproduction layer 101 and a recording layer 104, and further comprises an auxiliary layer 102 and an intermediate layer 103 for the purpose of improving characteristics, the direction of magnetization of the reproduction layer is aligned in advance in one direction using an initialization external magnetic field 10 before reproduction of a signal so as to mask magnetic domain information in the recording layer, a light spot 7 is then irradiated onto the medium, and an intersymbol interference upon reproduction is decreased, so as to transfer and reproduce magnetic domain information in the recording layer to only the reproduction layer in the high-temperature portion in the temperature distribution (FIG. 2C) of the medium formed upon irradiation of the light spot (FIGS. 2A and 2B), thereby allowing reproduction of a signal having a period equal to or smaller than the diffraction limit of light, and attempting to increase the recording density.

Furthermore, Japanese Laid-Open Patent Application No. 3-255946 attempts to increase the recording density using a medium which is basically constituted by a reproduction layer, an intermediate layer, and a recording layer. In this method, as shown in, e.g., FIGS. 3A to 3C, in a medium (FIG. 3B) which is moving at a given linear velocity (in a moving direction 8), comprises a reproduction layer 111, an intermediate layer 113, and a recording layer 114, and further comprises an auxiliary layer 112 for the purpose of improving characteristics, the direction of magnetization of the reproduction layer is aligned in advance in one direction using an initialization external magnetic field 10 before reproduction of a signal so as to mask magnetic domain information in the recording layer, a light spot 7 is then irradiated onto the medium, and an intersymbol interference upon reproduction is decreased, so as to align, in a direction of a reproduction magnetic field, the direction of magnetization of the reproduction layer in a high-temperature portion in the temperature distribution (FIG. 3C) of the medium formed upon irradiation of the light spot 7, and to transfer and reproduce magnetic domain information in the recording layer to only a middle-temperature portion (FIGS. 3A and 3B), thereby allowing reproduction of a signal having a period equal to or smaller than the diffraction limit of light, and attempting to increase the recording density.

However, in the magnetooptical recording media described in Japanese Laid-Open Patent Application Nos. 3-93056, 3-93058, and 3-255946, the film thickness of the reproduction layer must be increased to be able to sufficiently mask magnetic domain information in the recording layer so as to obtain a high S/N (C/N) ratio. More specifically, as described in Japanese Laid-Open Patent Application No. 4-255938, when the film thickness of the reproduction layer is equal to or smaller than 150 Å, the influence of the layer under the reproduction layer becomes 25% or higher, and super-resolution reproduction is disabled. For this reason, in order to obtain a practically required signal, a reproduction layer having a film thickness of 200 Å to 300 Å or more is necessary. As described above, in the magnetooptical recording medium, the film thickness of the reproduction layer, i.e., the total thickness of all the magnetic layers cannot be decreased since magnetic domain information in the recording layer must be masked.

In recent years, a demand for achieving a high recording density by increasing the linear velocity of a magnetooptical recording medium has increased. However, a medium having a thick magnetic layer requires large optical power for recording since it has a large heat capacity as a whole. However, since the output of the optical power of, e.g., a semiconductor laser is limited, it is difficult for the magnetooptical recording medium to meet this demand. Also, the C/N ratio cannot be increased by adopting an enhanced structure using a reflective layer. Furthermore, since magnetic materials normally use rare-earth metals with high material costs, it is difficult to provide an inexpensive magnetooptical recording medium since the material cost of the medium increases when a thick magnetic layer is used. Therefore, it is difficult to simultaneously realize a high density using a super-resolution technique, and high-speed recording, and to provide an inexpensive magnetooptical recording medium using the magnetooptical recording media and reproduction methods in the above-mentioned references.

Furthermore, in the reproduction methods of the above-mentioned references, the direction of magnetization of the reproduction layer must be aligned in one direction before irradiation by laser light. For this reason, a magnet for initializing the reproduction layer must be added to the conventional apparatus, and it is difficult to provide a low-cost, compact magnetooptical recording apparatus.

SUMMARY OF THE INVENTION

It is an object of the present invention to provide a high-density magnetooptical recording medium with low material cost, which can realize super-resolution and high-speed recording, and an information reproduction method using the medium.

In order to achieve the above object, there is provided a magnetooptical recording medium comprising a reproduction layer, a first recording layer, and a second recording layer, wherein sub lattice magnetic moments of the same kind of elements of the first and second recording layers are aligned in opposite directions.

Also, in order to achieve the above object, there is provided an information reproduction method for reproducing information recorded on a magnetooptical recording medium which comprises at least a reproduction layer, a first recording layer, and a second recording layer on a substrate, and in which sub lattice magnetic moments of the same kind of elements of the first and second recording layers are aligned in opposite directions, comprising:

the step of irradiating a light beam onto the medium to align a direction of magnetization of the reproduction layer in a direction stable with respect to magnetization of the first recording layer by an exchange coupling effect in only a local region in the irradiated portion; and the step of reproducing the information by detecting a magnetooptical change in light reflected by the medium.

In a magnetooptical recording medium according to the present invention, a recording layer has a two-layered structure in which sub lattice magnetic moments have opposite directions, so that the Kerr rotation angle ($\theta_K$) of the recording layer apparently becomes zero. For this reason, even when laser light is transmitted through the reproduction layer, magnetic domain information in the recording layer is not detected. Therefore, magnetic domain information in the recording layer need not be masked unlike in the super-resolution method described in each of the above references, and the film thickness of the reproduction layer, i.e., the total thickness of magnetic layers as a whole can be decreased. Therefore, in the magnetooptical recording medium and reproduction method according to the present invention, high-linear velocity recording can be realized, the recording speed can be increased, and cost can be reduced. At the same time, since a film structure using a reflective film can be adopted, an increase in C/N ratio by an enhance effect can be expected.

BRIEF DESCRIPTION OF THE DRAWINGS

FIG. 5A is a graph showing the temperature dependence of Ms and Hc in a first recording layer in an A-type recording layer;

FIG. 5B is a graph showing the temperature dependence of Ms and Hc in a second recording layer in the A-type recording layer;

FIG. 5C is a view illustrating a change in magnetization state due to a change in temperature in the A-type recording layer;

DETAILED DESCRIPTION OF THE PREFERRED EMBODIMENTS

(First Embodiment)

Figure 1A:
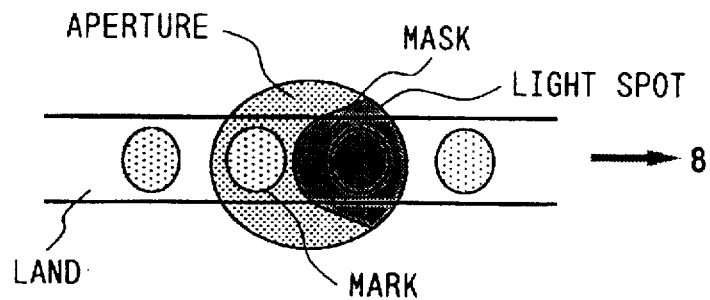
FIGS. 1A, 1B, and 1C are views for explaining the prior art.
Figure 1B:
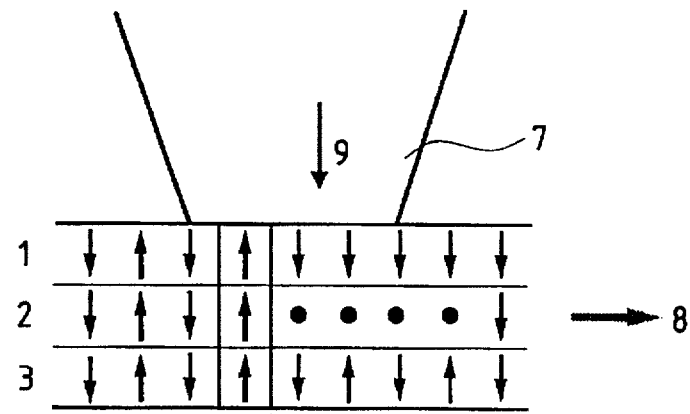
Figure 1C:
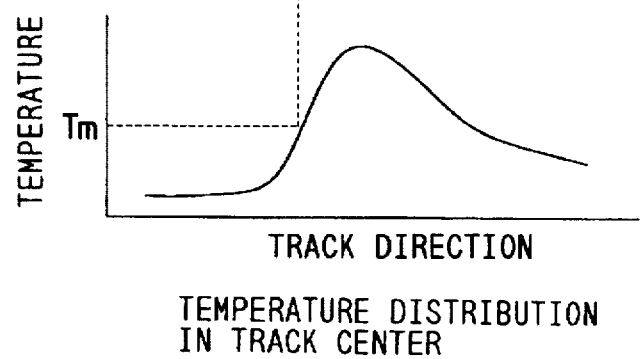
Figure 2A:
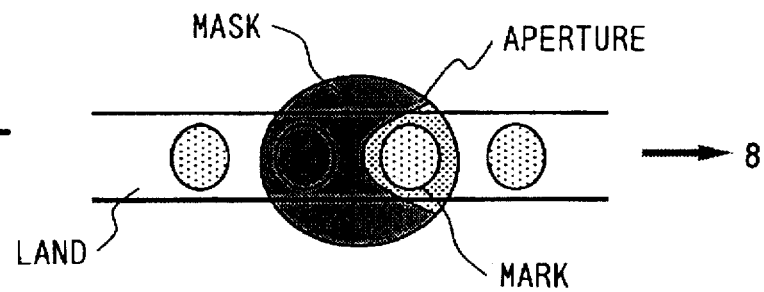
FIGS. 2A, 2B, and 2C are views for explaining another prior art.
Figure 2B:
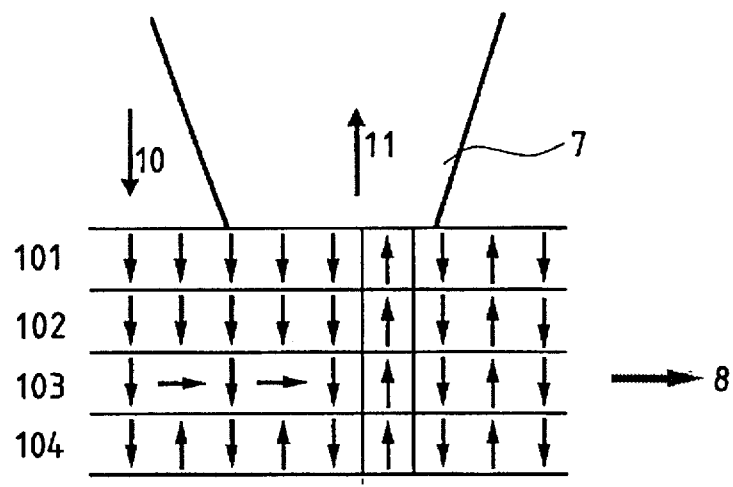
Figure 2C:
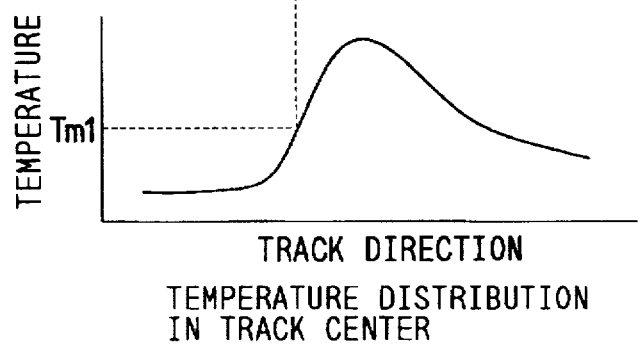
Figure 3A:
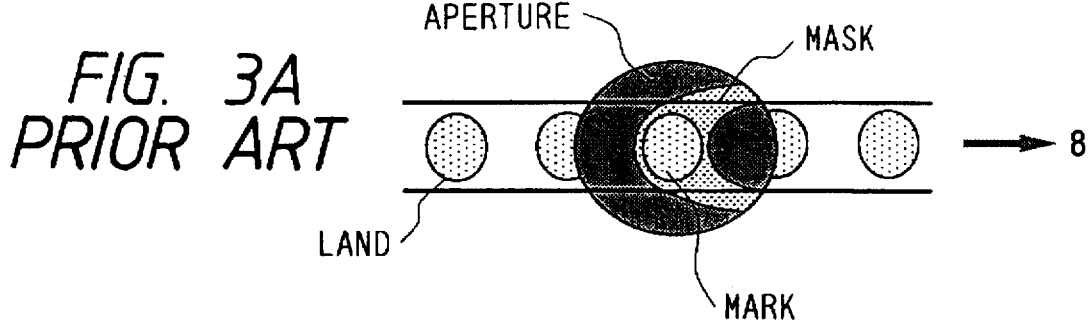
FIGS. 3A, 3B, and 3C are views for explaining still another prior art.
Figure 3B:
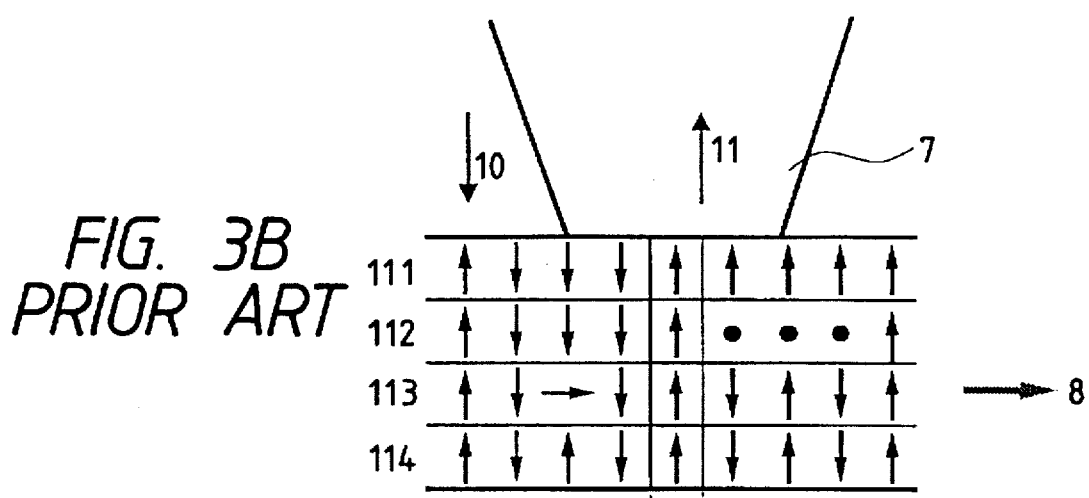
Figure 3C:
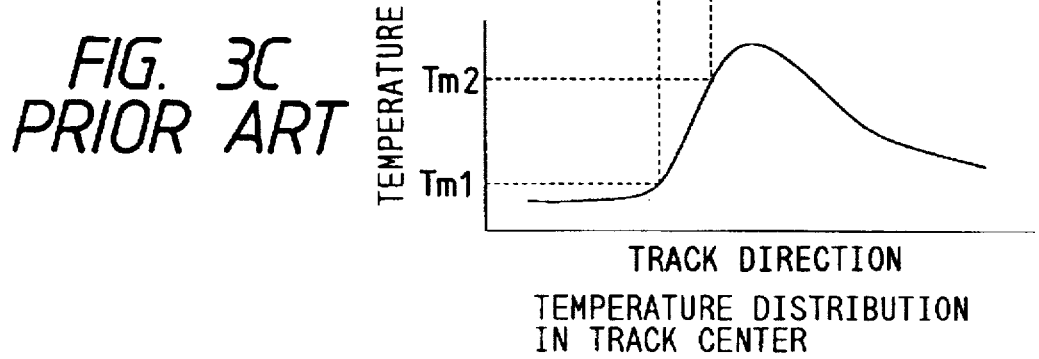
Figure 4:
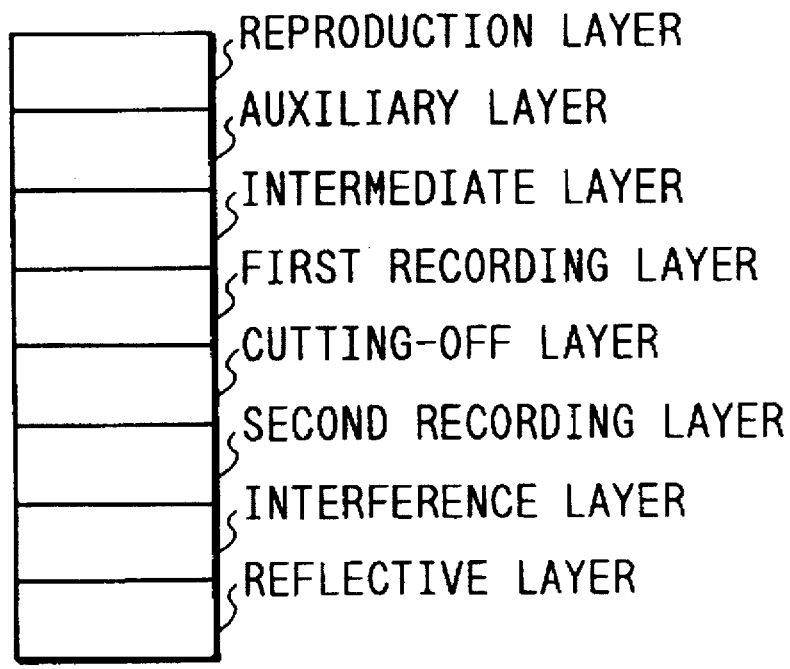
FIG. 4 is a schematic view showing an example of a film structure of a magnetooptical recording medium according to the first embodiment of the present invention.

A magnetooptical recording medium and a reproduction method using the medium according to the first embodiment of the present invention will be described in detail below with reference to the accompanying drawings.

As described above, a recording layer in a magnetooptical recording medium of the present invention has a two-layered film structure. In the following description, of the two-layered films, one layer on the light incidence side will be referred to as a first recording layer hereinafter, the other layer will be referred to as a second recording layer hereinafter, and the recording layer will indicate these layers as a whole.

As shown in FIG. 4 or FIGS. 7A to 7C, the magnetooptical recording medium of the first embodiment is constituted by stacking a reproduction layer, an auxiliary layer, an intermediate layer, a first recording layer, a cutting-off layer, a second recording layer, an interference layer, and a reflective layer. Of these layers, the auxiliary layer, the cutting-off layer, the interference layer, and the reflective layer need not always be arranged. The intermediate layer need not always be arranged, either. However, when the intermediate layer is not arranged, interface magnetic wall energy between the reproduction layer and the first recording layer must be reduced to a degree not to be zero by performing a plasma treatment in a residual gas atmosphere after formation of the reproduction layer.

The reproduction layer is a perpendicular magnetic layer at room temperature and in a temperature-raised state, and preferably consists of a rare earth-iron group amorphous alloy, and more specifically, GdCo, GdFeCo, TbFeCo, GdTbFeCo, GdDyFeCo, NdGdFeCo, or the like. When the thickness of the reproduction layer becomes equal to or smaller than 50 Å, a sufficiently strong reproduced signal cannot be obtained. For this reason, each of layers which contribute to the reproduced signal (the reproduction layer and layers (the auxiliary layer and the intermediate layer in the first embodiment) adjacent to the reproduction layer and having a sub lattice magnetic moment in the same direction as that of the reproduction layer in a reproduction region upon reproduction if such layers are present) preferably has a thickness of 80 Å or more, and more preferably, a thickness of 100 Å or more. If the thickness of each of these layers becomes larger than 300 Å, the effect of the present invention is reduced. For this reason, the thickness of each of the layers is preferably equal to or smaller than 300 Å and, more preferably, equal to or smaller than 200 Å.

Conditions of the reproduction magnetic field, coercive force, and the like for realizing magnetic super-resolution are as follows when Hi is the initialization magnetic field, Hr is the reproduction magnetic field, $Hw^R$ is the effective magnetic field acting on the reproduction layer by magnetic coupling, $Hc^R$ is the coercive force of the reproduction layer, Ta is the ambient temperature, Tm1 and Tm2 are the boundary temperatures between a mask and an aperture (Tm1<Tm2), Tmax is the maximum temperature, and T is the medium temperature.

The magnetization of the reproduction layer must satisfy (Formula 1) at the ambient temperature Ta to follow the direction of the initialization magnetic field.

$$Hc^R + Hw^R < Hi \text{ at } T=Ta \qquad \text{(Formula 1)}$$

where $Hw^R$ is given by (Formula 2) below:

$$Hw^R = \frac{\sigma w^{RM1}}{2Ms^R h^R} \qquad \text{(Formula 2)}$$

where $h^R$ is the film thickness of the reproduction layer, $Ms^R$ is the saturation magnetization of the reproduction layer, and $\sigma w^{RM1}$ is the interface magnetic wall energy between the reproduction layer and the first recording layer. When magnetic layers such as an intermediate layer are inserted, the interface magnetic wall energy $\sigma w^{RM1}$ has a value obtained via these layers.

In order to maintain a magnetic wall between the reproduction layer and the recording layer after having passed the initialization magnetic field Hi, a condition given by (Formula 3) is required:

$$Hc^R > Hw^R \text{ at } Ta \leq T < Tm1 \qquad \text{(Formula 3)}$$

When the reproduction magnetic field Hr which satisfies the following condition given by (Formula 4) in a high-temperature region in a light spot is applied, magnetization information in the recording layer is transferred to the reproduction layer:

$$Hc^R - Hw^R < Hr < Hc^R + Hw^R \text{ at } T > Tm1 \qquad \text{(Formula 4)}$$

The intermediate layer is used for allowing the reproduction layer to easily reverse its direction of magnetization by the initialization magnetic field at ambient temperature. For this purpose, a magnetic layer having a weak perpendicular magnetic anisotropy or having a longitudinal magnetic anisotropy is used to weaken the magnetic wall energy between the reproduction layer and the first recording layer. The magnetic film is required to have a film thickness of at least 10 Å or more, preferably, 20 Å or more, and more preferably, 30 Å or more.

In addition, the auxiliary layer may be formed on a surface, opposite to the light incidence side, of the reproduction layer. The auxiliary layer is used for assisting the characteristics of the reproduction layer. This auxiliary layer compensates for the coercive force, at room temperature, of the reproduction layer, so that the magnetization of the reproduction layer aligned by the initialization magnetic field is stably present even when a magnetic wall is present, and the coercive force abruptly decreases at a temperature near the reproduction temperature. Thus, the magnetic wall confined in the intermediate layer or the like extends to the auxiliary layer, and finally, the direction of magnetization of the reproduction layer is reversed to cause the magnetic wall to disappear, thus allowing easy transfer of recorded marks.

When the auxiliary layer is arranged, if $Ms^s$ is the saturation magnetization of the auxiliary layer and $h^s$ is the film thickness of the auxiliary layer, the coercive force $Hc^R$ of the reproduction layer is replaced by $Hc^{RA}$ given by Formula 5, and the effective magnetic field $Hw^R$ by the interface magnetic wall between the reproduction layer and the recording layer is replaced by $Hw^{RA}$ given by Formula 6.

$$Hc^{RA} = \frac{Ms^R h^R Hc^R + Ms^S h^S Hc^S}{Ms^R h^R + Ms^S h^S}$$ (Formula 5)

$$Hw^{RA} = \frac{\sigma w^{RM1}}{2Ms^R h^R + 2Ms^S h^S}$$ (Formula 6)

Furthermore, when the auxiliary layer and the intermediate layer are arranged between the reproduction layer and the recording layer, the Curie temperature of the auxiliary layer is decreased, or when only the intermediate layer or the auxiliary layer is arranged between the reproduction layer and the recording layer, the Curie temperature of the intermediate layer or the auxiliary layer is decreased, thereby realizing the super-resolution method described in Japanese Laid-Open Patent Application No. 4-255946. For this purpose, (Formula 7) below must be satisfied.

$$Hr > Hc^R + Hw^R \text{ at } T > Tm2$$ (Formula 7)

The first and second recording layers constituting the recording layer preferably consist of a material which has a large perpendicular magnetic anisotropy and can stably maintain a magnetization state, for example, a rare earth-iron group amorphous alloy (e.g., TbFeCo, DyFeCo, TbDyFeCo, or the like), garnet, or a platinum group-iron group periodic structure film, e.g., a Pt/Co or Pd/Co platinum group-iron group alloy (e.g., PtCo, PdCo, or the like).

As the film thickness of the recording layer, each of the first and second recording layers preferably has a thickness not more than 20 Å but less than 300 Å. In order to cancel the rotation of the plane of polarization on the recording layer, the first recording layer near the incident side preferably has a thickness smaller than that of the second recording layer since it largely influences the rotation of the plane of polarization, when the first and second recording layers have almost the same complex indices of refraction.

As the composition of the recording layer, when a recording layer consisting of a ferrimagnetic rare earth (RE)-iron group transition metal (TM) alloy is used, the following two different compositions are available. In one composition, the recording layer is prepared by stacking two layers, i.e., a magnetic layer of the first type, which is rare earth element dominant at room temperature, and does not have a compensation temperature between room temperature and the Curie temperature, and a magnetic layer of the second type, which is iron group transition metal dominant at room temperature, and does not have a compensation temperature between room temperature and the Curie temperature (to be referred to as A type hereinafter). In the other composition, the recording layer is prepared by stacking two different layers, i.e., a magnetic layer of the third type which is rare earth element dominant at room temperature, and has a compensation temperature between room temperature and the Curie temperature, and a magnetic layer of the fourth type, which is rare earth element dominant at room temperature, and does not have a compensation temperature between room temperature and the Curie temperature (to be referred to as P type hereinafter).

When a "rare earth element is dominant (RE rich)", it indicates that the sub lattice magnetic moment of the rare earth element is larger than that of an iron group transition metal element; when an "iron group transition metal element is dominant (TM rich)", it indicates that the sub lattice magnetic moment of the iron group transition metal element is larger than that of a rare earth element.

In either the A- or P-type recording layer, the Curie temperatures of the first and second recording layers are preferably set to be almost equal to each other although they need not always be exactly equal to each other.

The sub lattice magnetic moment of a rare earth element of the first recording layer and that of a rare earth element of the second recording layer, and the sub lattice magnetic moment of an iron group transition metal element of the first recording layer and that of an iron group transition metal element of the second recording layer must be oriented in opposite directions, respectively. For this purpose, the effective magnetic field by magnetic coupling caused between these magnetic layers can be set to be smaller than the coercive forces of the respective layers. More specifically, if $Hw^{M1}$ is the effective magnetic field acting on the first recording layer by magnetic coupling with the second recording layer, $Ms^{M1}$ is the saturation magnetization of the first recording layer, $h^{M1}$ is the film thickness of the first recording layer, $Hc^{M1}$ is the coercive force of the first recording layer, $Hw^{M2}$ is the effective magnetic field acting on the second recording layer by magnetic coupling with the first recording layer, $Ms^{M2}$ is the saturation magnetization of the second recording layer, $h^{M2}$ is the film thickness of the second recording layer, and $Hc^{M2}$ is the coercive force of the second recording layer, (Formula 8) and (Formula 9) can be satisfied if the effective magnetic field by magnetic coupling with the reproduction layer is ignored.

$$Hw^{M1} < Hc^{M1}$$ (Formula 8)

$$Hw^{M2} < Hc^{M2}$$ (Formula 9)

where $Hw^{M1}$ and $Hw^{M2}$ are respectively given by (Formula 10) and (Formula 11).

$$Hw^{M1} = \frac{\sigma w^{M1M2}}{2Ms^{M1} h^{M1}}$$ (Formula 10)

$$Hw^{M2} = \frac{\sigma w^{M1M2}}{2Ms^{M2} h^{M2}}$$ (Formula 11)

where $\sigma w^{M1M2}$ is the interface magnetic wall energy between the first and second recording layers. When the cutting-off layer is inserted, the interface magnetic wall energy has a value obtained via the cutting-off layer.

The magnetic wall energy w has a value as large as about 3 to 4 erg/cm² between magnetic layers such as TbFeCo layers each having a large perpendicular magnetic anisotropy. For this reason, the film thickness of each layer must be increased. However, when a magnetic layer having a small perpendicular magnetic anisotropy, a magnetic layer which has a longitudinal magnetic anisotropy in which the longitudinal magnetic component is larger than the perpendicular magnetic component with respect to the substrate surface, a dielectric layer, or a non-magnetized metal layer is inserted between the first and second recording layers, the exchange coupling force can be sufficiently decreased or cut off without increasing the film thickness. This is the role of the cutting-off layer. The interface magnetic wall energy σw becomes as small as about 1 to 2 erg/cm² if a magnetic layer having a small perpendicular magnetic anisotropy, e.g., a GdFeCo film is used. Furthermore, in order to cut off exchange coupling between the first and second recording layers, the cutting-off layer can be set to consist of a dielectric such as SiN, $AlN_x$, $AlO_x$, $TaO_x$, $SiO_x$, or the like. These dielectrics can almost completely cut off the exchange coupling interaction when they have a thickness of 10 to 20 Å or more. Since the exchange interaction need not occur between the first and second recording layers, the above-mentioned dielectric is more preferably used as the cutting-off layer.

In order to preserve magnetization information of the first recording layer during application of the initialization magnetic field upon reproduction, if $Hw^{M1R}$ is the effective magnetic field acting on the first recording layer by magnetic coupling with the reproduction layer, (Formula 12) must be satisfied at the ambient temperature Ta.

$$Hc^{M1} - Hw^{M1R} > Hi \text{ at } T=Ta \quad \text{(Formula 12)}$$

In order to preserve magnetization information of the first recording layer during application of the reproduction magnetic field, (Formula 13) must be satisfied at the maximum temperature Tmax or less upon reproduction.

$$Hr < Hc^{M1} - Hw^{M1R} \text{ at } T<Tmax \quad \text{(Formula 13)}$$

In order to preserve magnetization information of the second magnetic layer during reproduction, (Formula 14) must be satisfied at the maximum temperature Tmax or less upon reproduction.

$$Hr < Hc^{M2} - Hw^{M2} \text{ at } T<Tmax \quad \text{(Formula 14)}$$

In (Formula 12) to (Formula 14) above, it is assumed that ($Hw^{M1}$ and $Hw^{M2}$ are 0) when magnetic coupling between the first and second recording layers is cut off by adopting, e.g., a dielectric layer as the cutting-off layer.

Note that elements such as Cr, Al, Ti, Pt, Nb, and the like for improving corrosion resistance may be added to the reproduction layer, the intermediate layer, and the recording layer.

When incident light is transmitted through the recording layer, the reflective layer may be arranged on a surface, opposite to the incident surface, of the recording layer to prevent a decrease in returned light amount by reflecting the incident light and to enhance the incident light between the magnetic layer and the reflective layer. In addition to the reflective layer, a dielectric layer consisting of, e.g., SiN, $AlN_x$, $AlO_x$, $TaO_x$, $SiO_x$, or the like may be arranged as the interference layer between the second recording layer and the reflective layer so as to improve the interference effect.

The interference layer must have a film thickness that can cancel $\theta_K$ in the recording layer and can obtain a desired reflectance. Alternatively, for the purpose of improving the magnetic domain shape upon execution of a magnetic field modulation overwrite operation, a heat conductive layer may be arranged to improve heat conductivity. The reflective layer and the heat conductive layers may consist of Al, AlTa, AlTi, AlCr, Cu, or the like. The reflective layer must have a small thickness, so that light can be sufficiently reflected and the reflective layer and the heat conductive layer must have a small thickness, so that optical power can be prevented from becoming too large. The heat conductive layer and the reflective layer may be constituted by a single layer. Furthermore, the dielectric layer or a protective coat consisting of a polymer resin may be added as a protective layer.

A method of recording information on the recording layer of the magnetooptical recording medium of the present invention will be described below.

In the case of the A-type recording layer, as shown in FIGS. 5A and 5B showing examples of the saturation magnetization Ms and the coercive force Hc and FIG. 5C showing an example of the magnetization state, from a state wherein the same kinds of sub lattice magnetic moments are oriented in the opposite directions at room temperature (RT) (①), the temperature of the medium is raised using laser light to a temperature near the Curie temperature (Tc) of the recording layer (②). Thereafter, an external magnetic field Hb is applied (or is applied from the beginning) to reverse the direction of magnetization of the two recording layers (③). Thereafter, the medium is cooled to room temperature, and the magnetization states of the two recording layers are stabilized in a state having sub lattice magnetic moments opposite to those in ①. At this time, when the first and second magnetic layers are magnetically coupled to each other, the effective external magnetic field by magnetic coupling must be prevented from becoming larger than a magnetization reversal magnetic field (coercive force) so as not to re-reverse the magnetic moments during a process from ③ to ④. In the above-mentioned A-type recording layer, the first recording layer is TM rich at room temperature, and the second recording layer is RE rich at room temperature. Contrary to this, the first recording layer may be RE rich at room temperature, and the second recording layer may be TM rich at room temperature.

Figure 6A:
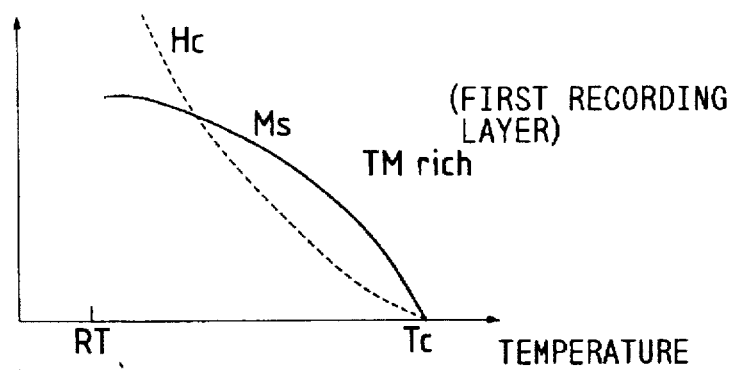
FIG. 6A is a graph showing the temperature dependence of Ms and Hc in a first recording layer in a P-type recording layer.
Figure 6B:
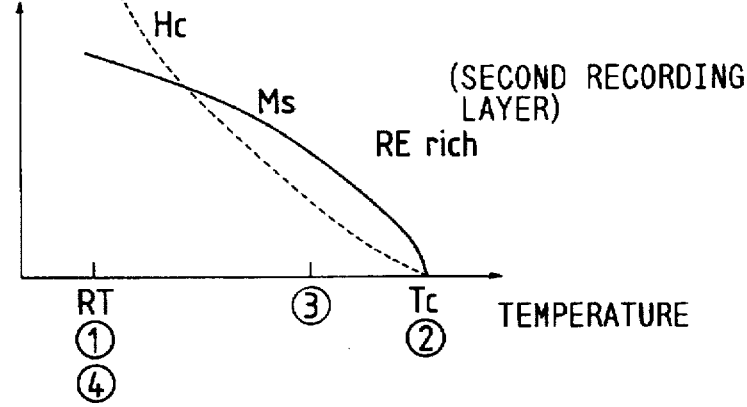
FIG. 6B is a graph showing the temperature dependence of Ms and Hc in a second recording layer in the P-type recording layer.
Figure 6C:
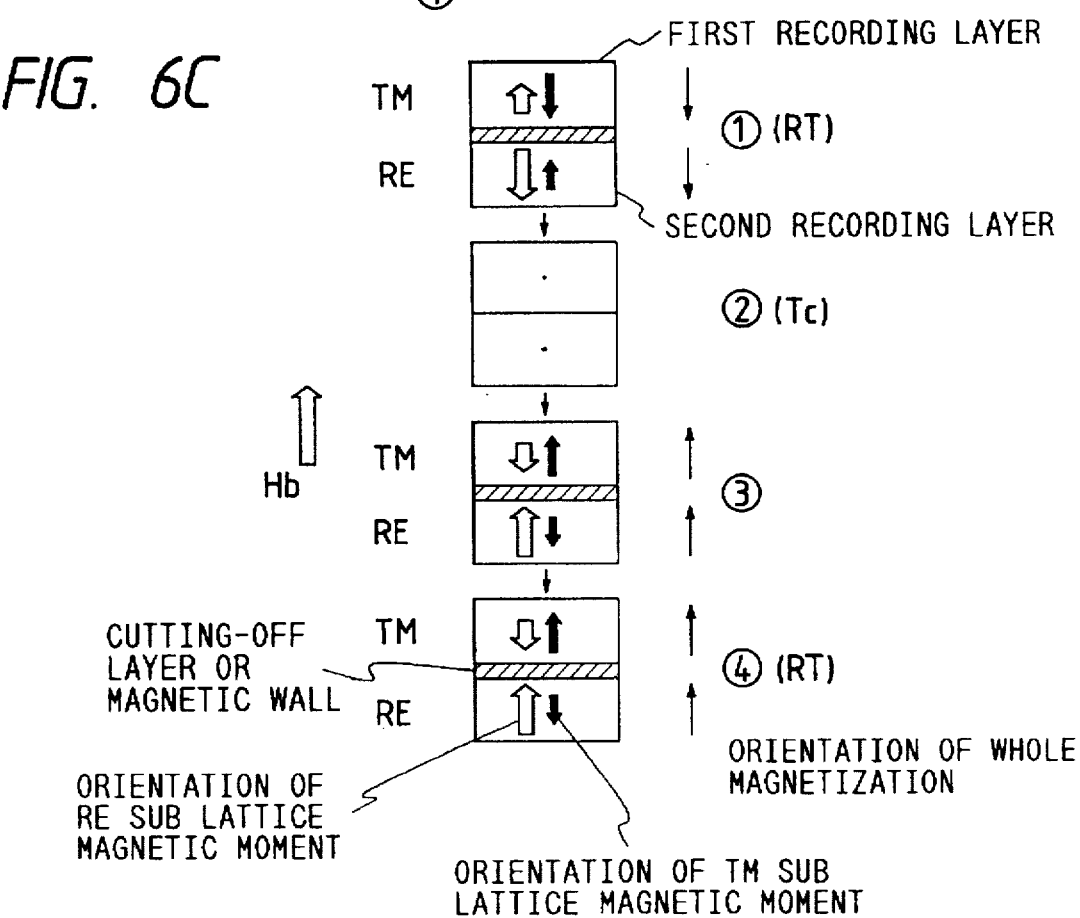
FIG. 6C is a view illustrating a change in magnetization state due to a change in temperature in the P-type recording layer.

In the case of the P-type recording layer, as shown in FIGS. 6A and 6B showing examples of the saturation magnetization Ms and the coercive force Hc and FIG. 6C showing an example of the magnetization state, from a state wherein the sub lattice magnetic moments are oriented in the opposite directions at room temperature (RT) (①), the temperature of the medium is raised to a temperature near the Curie temperature (②). Thereafter, an external magnetic field Hb is applied (or is applied from the beginning) to reverse the direction of magnetization of the two recording layers (③). Thereafter, since the temperature of the medium passes a compensation temperature (Tcomp) before it is cooled to room temperature, both the two recording layers are stabilized in a state wherein the sub lattice magnetic moments are oriented in the opposite directions and the orientations of the whole magnetizations are anti-parallel. At this time, the effective external magnetic field by magnetic coupling must be prevented from becoming larger than a magnetization reversal magnetic field (coercive force) so as not to re-reverse the magnetic moments during a process from ③ to ④. In the above-mentioned P-type recording layer, the first recording layer may be a film which has a compensation temperature between room temperature and the Curie temperature and is RE rich at room temperature, and the second recording layer may be a film which does not have a compensation temperature between room temperature and the Curie temperature and is RE rich at room temperature. In the case of the P-type recording layer, since the directions of magnetizations of the first and second recording layers are opposite to each other before the temperature of the first recording layer reaches its compensation temperature, as shown in FIGS. 5A to 5C, the magnitude of the magnetization of the recording layer as a whole can be decreased. Therefore, the adverse influence (e.g., noise generated by a disturbed recorded magnetic domain shape) of magnetic field leakage from the surrounding recording layer portion during recording is expected to be eliminated.

In the above-mentioned methods for both the A- and P-type recording layers, information is recorded in a direction opposite to that in an original state. When information is recorded in the same direction as that in an original state, substantially the same operations as described above are performed, except that the direction of the external magnetic field is opposite to that described above.

In the above-mentioned recording method of each type, by reversing the direction of the external magnetic field in accordance with recording information while irradiating light, or by setting the intensity of the laser beam in consideration of the linear velocity of the recording medium, so that only a predetermined region in the light spot has a temperature near the Curie temperature of the recording layer while applying the external magnetic field, a recorded magnetic domain having a size equal to or smaller than the light spot size can be formed, and as a result, information having a period equal to or smaller than the diffraction limit of light can be recorded.

A reproduction method of the magnetooptical recording medium according to the first embodiment of the present invention will be described below.

First, the medium is rotated. While irradiating a light spot onto the medium, a reproduction magnetic field 11 is applied to the portion irradiated by the light spot. On a portion other than the portion irradiated by the light spot, an initialization magnetic field 10 in a direction opposite to that of the reproduction magnetic field is applied to the medium.

Figure 7A:
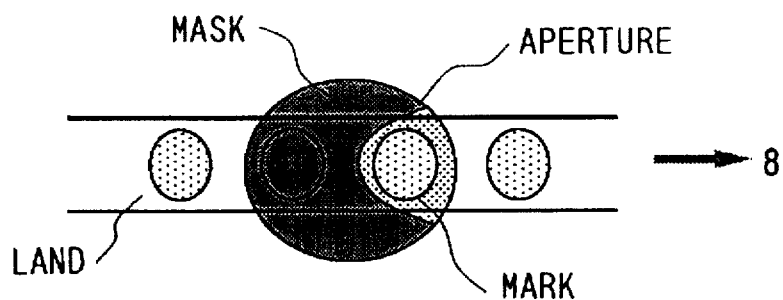
FIG. 7A is a view showing an aperture and a mask in a light spot.
Figure 7B:
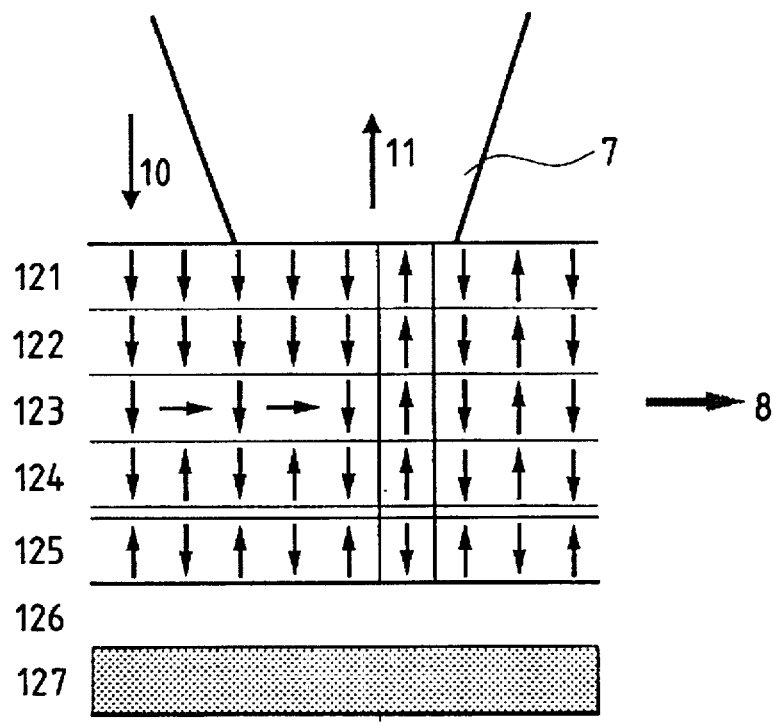
FIG. 7B is a view showing an example of a film structure of a magnetooptical recording medium according to the first embodiment of the present invention, and a magnetization state upon reproduction.
Figure 7C:
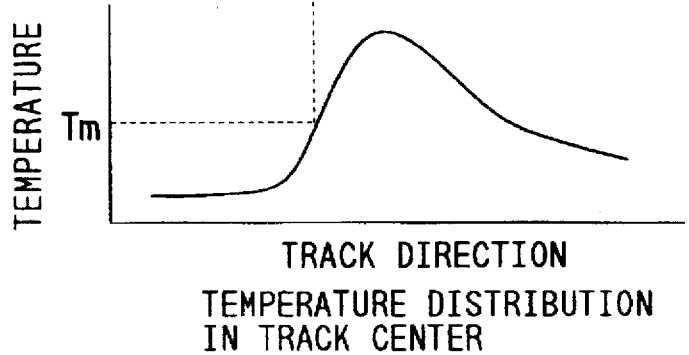
FIG. 7C is a graph showing the temperature distribution of the medium upon reproduction.

At this time, as shown in FIGS. 7B and 7C, at room temperature and in a low-temperature portion (T<Tm1) in the light spot, the direction of magnetization of a reproduction layer 121 is oriented in the direction of the initialization magnetic field 10 by this initialization magnetic field 10. In a portion having a temperature equal to or higher than a middle temperature (T>Tm1), magnetization information in a first recording layer 124 is transferred to the reproduction layer 121 with the assist of the reproduction magnetic field and by the exchange coupling force. More specifically, in a light spot 7, as shown in FIG. 7A, an aperture portion from which a recorded mark is detected and a mask portion from which no recorded mark is detected are formed.

Figure 8A:
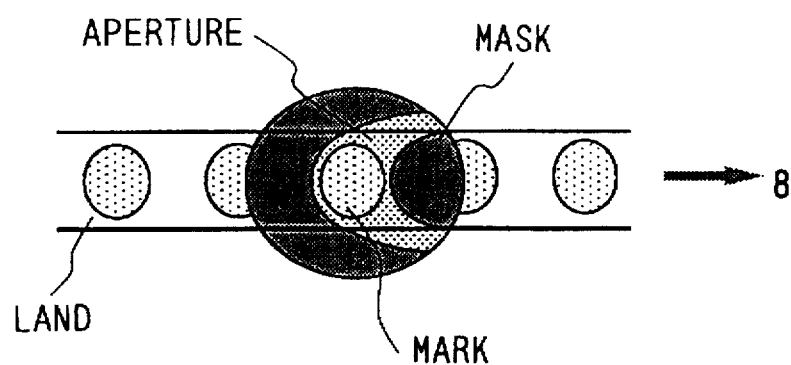
FIG. 8A is a view showing an aperture and a mask in a light spot.
Figure 8B:
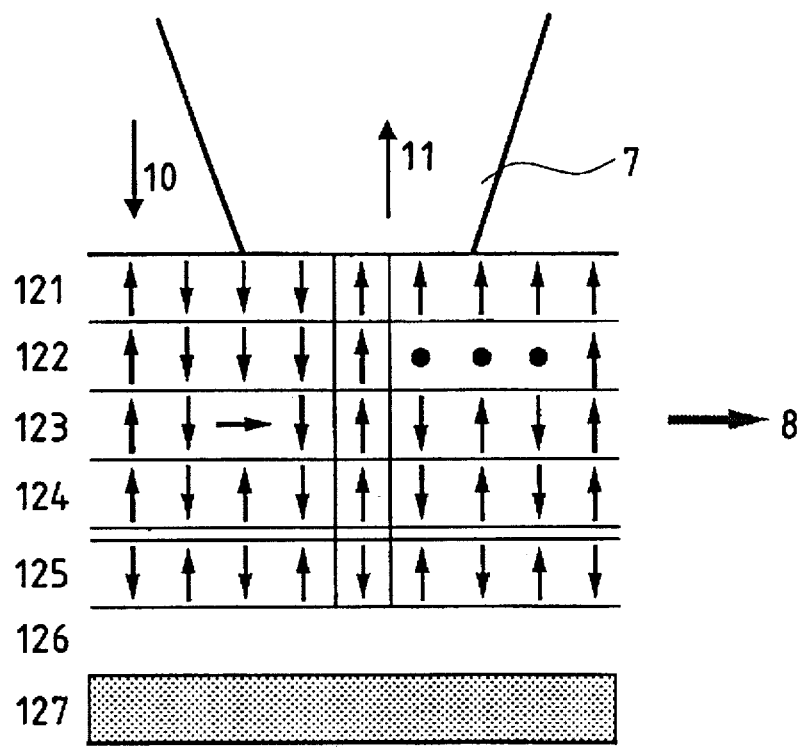
FIG. 8B is a view showing another example of a film structure of a magnetooptical recording medium according to the first embodiment of the present invention, and a magnetization state upon reproduction.
Figure 8C:
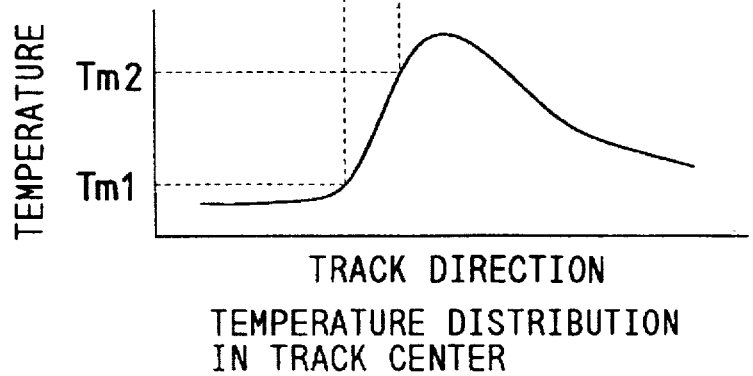
FIG. 8C is a graph showing the temperature distribution of the medium upon reproduction.

When reproduction power is further raised, or when the Curie temperature of an auxiliary layer 122 is lowered, since the temperature of a high-temperature region (T>Tm2) has reached the Curie temperature of the auxiliary layer 122, as shown in FIG. 8C, the exchange coupling force acting from the first recording layer 124 to the reproduction layer 121 stops, and the magnetization of the reproduction layer 121 is oriented in the direction of a reproduction magnetic field 11, thus forming a mask region again. In this case, the magnetization in the first recording layer is transferred to the reproduction layer in only a middle-temperature region (Tm1<T<Tm2).

When a magnetooptical change in light reflected by the medium (i.e., a change in Kerr rotation angle) is detected, information transferred to the reproduction layer is reproduced.

Since the same kinds of sub lattice magnetic moments are oriented in the opposite directions in the first recording layer 124 and a second recording layer 125, the plane of polarization of light transmitted through the reproduction layer 121 is rotated by the first recording layer and is then rotated in the opposite direction by the second recording layer 125. Thereafter, the light returns to the magnetooptical recording apparatus. For this reason, if the rotation angle of the plane of polarization polarized by the first recording layer 124 is set to be equal to the rotation angle of the plane of polarization polarized by the second recording layer 125, the Kerr rotation angle is not influenced by these recording layers. Therefore, light which is transmitted through the reproduction layer 121 and is reflected by the second recording layer 125 or a reflective layer 127 has only rotation of the plane of polarization influenced by the magnetooptical effect of the reproduction layer 121. In other words, even when the incident light is transmitted through the reproduction layer 121, magnetic domain information of the recording layer is not detected. In this case, the reflective layer 127 may be directly stacked on the second recording layer 125. However, as shown in FIG. 7B, an interference layer 126 consisting of a dielectric is inserted between the second recording layer 125 and the reflective layer 127 to realize an enhance structure for increasing $\theta_K$. Alternatively, the second recording layer 125 may be formed to be relatively thick without forming a reflective layer, so as to reflect a sufficient amount of light, and the Kerr rotation angle may be canceled by the first and second recording layers 124 and 125.

Since the magnetooptical recording medium of the present invention do not require masking of magnetization information of the recording layer using the reproduction layer 121 and a layer having a sub lattice magnetic moment in the same direction as the reproduction layer 121, the thicknesses of these layers can be reduced to a degree not to deteriorate the reproduced signal. Therefore, the film thickness of the magnetic layer can be greatly decreased as compared to the prior art.

The first embodiment of the present invention will be described in more detail below by way of its experimental examples. However, the present invention is not limited to the following experimental examples if intended changes fall within the scope of the present invention.

(EXPERIMENTAL EXAMPLE 1)

Of the film structure of the magnetooptical recording medium of the present invention, the reproduction layer was removed, and it was examined if a two-layered film including the first and second recording layers had a structure for canceling $\theta_K$.

Si, Tb, Fe, Co, and Al targets were attached to a DC magnetron sputtering apparatus, and a glass substrate having a diameter of 130 mm was fixed to a substrate holder arranged at a position separated by 150 mm from the respective targets. Thereafter, the interior of a chamber was vacuum-evacuated by a cryopump to a high vacuum of $1\times10^{-5}$ Pa or less.

Figure 10:
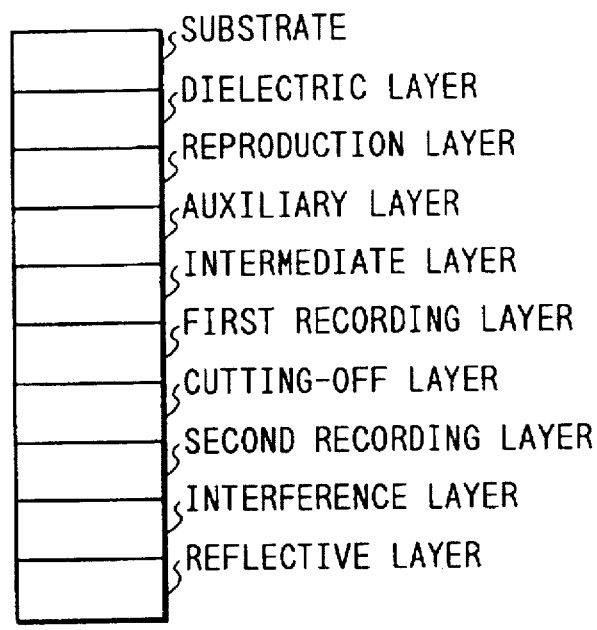
FIG. 10 is a view showing a film structure of Experimental Examples 2 to 4 of magnetooptical recording media according to the first embodiment of the present invention.

While performing vacuum evacuation, Ar gas was supplied into the chamber up to 0.4 Pa, and thereafter, an 800-Å thick SiN dielectric layer, a 60-Å thick TbFeCo first recording layer, a 20-Å thick SiN cutting-off layer, a 100-Å thick TbFeCo second recording layer, a 300-Å thick SiN interference layer, and a 600-Å thick Al reflective layer were sequentially formed to obtain a sample having a structure shown in FIG. 10A.

Upon formation of the SiN layers, $N_2$ gas was supplied in addition to the Ar gas, and films were formed by a DC reactive sputtering method. In this case, the mixing ratio of the Ar and $N_2$ gases was adjusted to realize a refractive index of 2.1. The TbFeCo layers were formed while adjusting compositions by independently applying DC power to the Tb, Fe, and Co targets.

The composition of the TbFeCo first recording layer was set, so that the first recording layer was TM rich at room temperature and had a Curie temperature of 200° C. The composition of the TbFeCo second recording layer was set, so that the second recording layer was RE rich at room temperature, did not have a compensation temperature, and had a Curie temperature of 200° C.

Figure 9A:
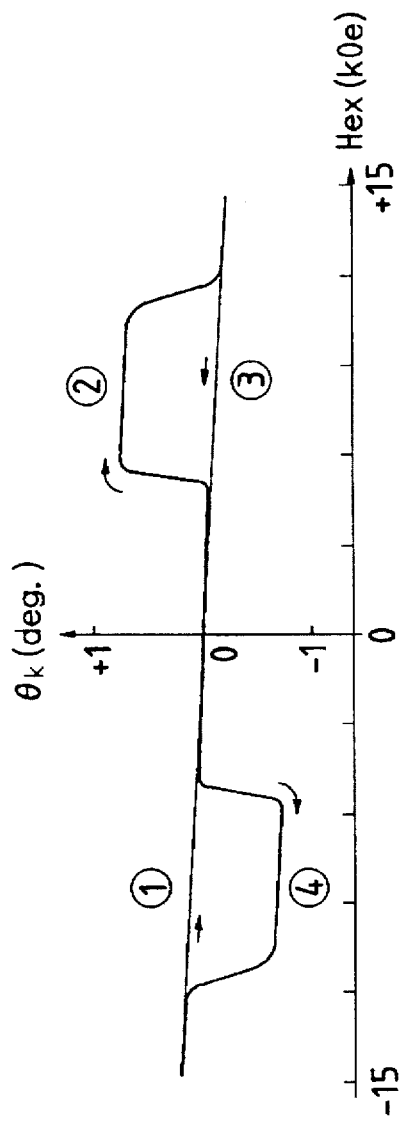
FIG. 9A is a graph showing the relationship between the Kerr rotation angle $\theta_K$ and the external magnetic field Hex in the first embodiment.
Figure 9B:
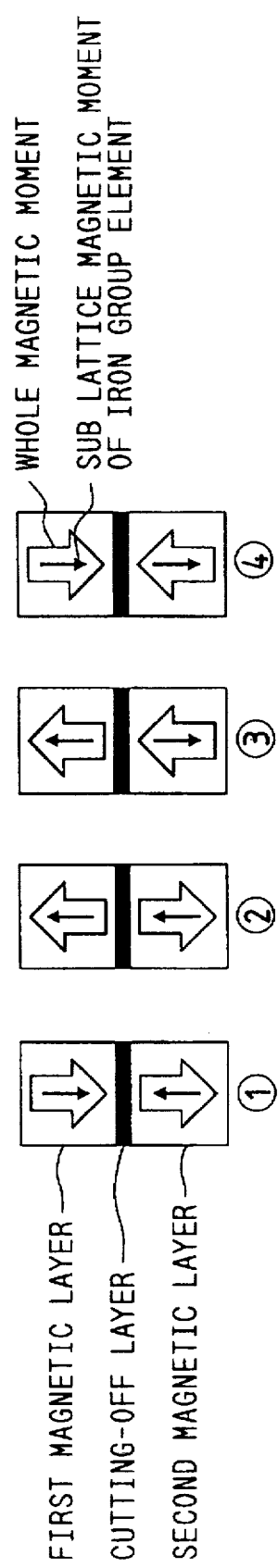
FIG. 9B is a view showing the magnetization state in FIG. 9A.

After this sample was prepared, the magnetic field dependence of $\theta_K$ was examined using a Kerr rotation angle evaluation device. A heater of a resistive heating wall was placed on the film side of the sample to adjust the sample temperature, and a semiconductor laser beam of 830 nm was irradiated from the glass substrate side, thereby obtaining $\theta_K$ by a circularly polarized light modulation method while sweeping an external magnetic field (Hex) of a maximum of 15 kOe in a direction perpendicular to the substrate surface. FIG. 9A is a $\theta_K$-Hex graph at 120° C. obtained by the above-mentioned operation. In FIG. 9A, a curve of $\theta_K$ defined by sweeping the magnetic field from the "+" side coincides with a curve obtained by sweeping the magnetic field from the "−" side within a range of ±5 kOe, and when the magnetic field=0, $\theta_K$ becomes 0. Since the magnetooptical effect at 830 nm is mainly caused by magnetization of an iron group element, a transition from ① to ② is caused by reversal of the direction of magnetization of the first recording layer, a transition from ② to ③ is caused by reversal of the direction of magnetization of the second recording layer, and states ①, ②, ③, and ④ are assumed to be magnetization states shown in FIG. 9B. It was found from these states that $\theta_K$ of the magnetic layers having sub lattice magnetic moments in the opposite directions canceled each other, and $\theta_K$ could apparently become zero as a whole.

(EXPERIMENTAL EXAMPLE 2)

Following the same procedures as in Experimental Example 1, Si, Tb, Gd, Fe, Co, and Al targets were attached to a DC magnetron sputtering apparatus, and an 800-Å thick SiN dielectric layer, a 100-Å thick GdFeCo reproduction layer, a 20-Å thick TbFeCoAl auxiliary layer, a 30-Å thick GdFeCo intermediate layer, a 46-Å thick TbFeCo first recording layer, a 10-Å thick SiN cutting-off layer, a 60-Å thick TbFeCo second recording layer, a 300-Å thick SiN interference layer, and a 600-Å Al reflective layer were sequentially formed on a pre-grooved polycarbonate substrate having a diameter of 130 mm, thus obtaining a magnetooptical recording medium of the present invention with a structure shown in FIG. 10D.

The composition of the GdFeCo reproduction layer was set, so that the reproduction layer was TM rich at room temperature and had a Curie temperature of 300° C. or higher. The composition of the TbFeCoAl auxiliary layer was set, so that the auxiliary layer was TM rich at room temperature and had a Curie temperature of 190° C., and $Hc^{RA}$ was set to be 3 kOe. The composition of the GeFeCo intermediate layer was set so that the intermediate layer was TM rich at room temperature and had a Curie temperature of 230° C. The composition of the TbFeCo first recording layer was set so that the first recording layer was TM rich at room temperature, and had a Curie temperature of 250° C. The composition of the TbFeCo second recording layer was set, so that the second recording layer was RE rich at room temperature and had a Curie temperature of 250° C.

This magnetooptical recording medium was rotated at a rotational speed of 2,600 rpm, an RF signal of 12.5 MHz was written at a radial position of 37 mm to have a recorded mark length of 0.40 μm, and an RF signal of 6.4 MHz was written to have a recorded mark length of 0.78 nm. The linear velocity of the medium at that time was 10 m/s. Thereafter, a reproduction magnetic field of 400 Oe was applied to measure the C/N ratios of the respective marks. An objective lens of an optical head had an NA of 0.55, and the laser wavelength was 780 nm.

Signals of 3.2 MHz, 9.6 MHz, and 12.8 MHz were recorded to have a mark length of 0.78 μm, while changing stepwise the linear velocity to 5 m/s (rotational speed=1,300 rpm and radial position=37 mm), 15 m/s (rotational speed= 3,600 rpm and radial position=40 mm), 20 m/s (rotational speed=3,600 rpm and radial position=54 mm), and 25 m/s (rotational speed=3,980 rpm and radial position=60 mm), and a minimum recording power level Pw which could yield a C/N ratio of 48 dB was obtained. The reproduction power level was set to have values (2.5 to 3.5 mW) corresponding to the maximum C/N ratios at the corresponding recording power levels.

Figure 11:
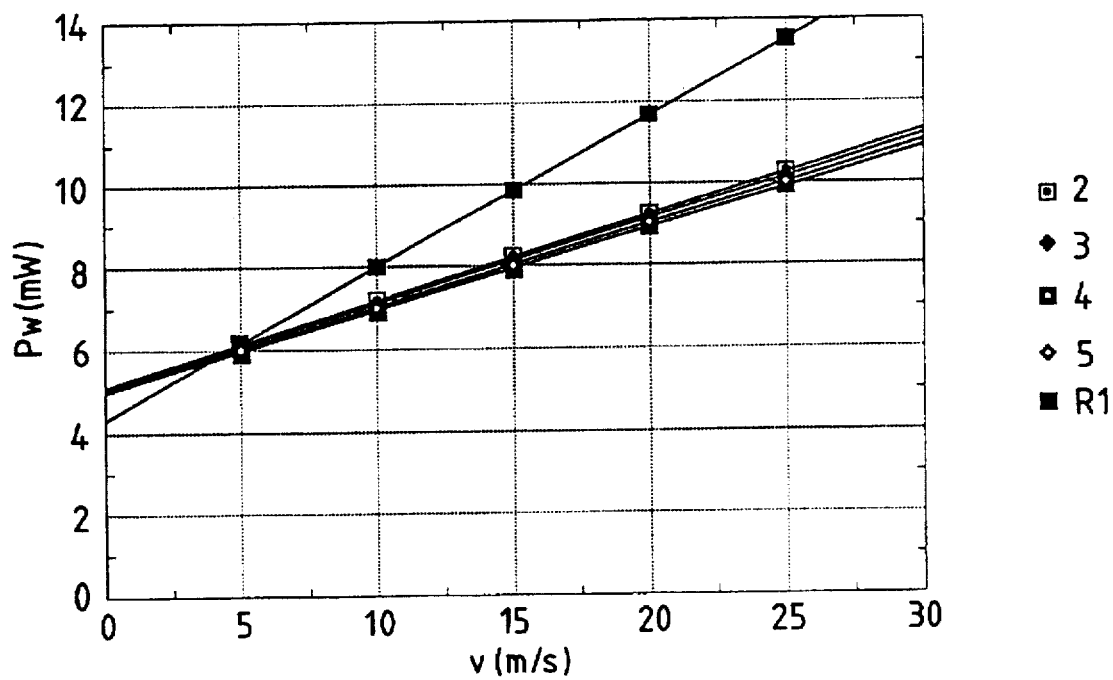
FIG. 11 is a graph showing the relationship between the recording power and the linear velocity in the experimental examples and a comparative experimental example of the present invention.

The recording/reproduction characteristics were measured using this magnetooptical recording medium as in Experimental Example 1. Table 1 and FIG. 11 (symbol 2) show the measurement results.

(EXPERIMENTAL EXAMPLE 3)

An 800-Å thick SiN dielectric layer, a 120-Å thick GdFeCo reproduction layer, a 30-Å thick TbFeCoAl auxiliary layer, a 50-Å thick GdFeCo intermediate layer, a 56-Å thick TbFeCo first recording layer, a 10-Å thick SiN cutting-off layer, a 100-Å thick TbFeCo second recording layer, a 300-Å thick SiN interference layer, and a 600-Å Al reflective layer were sequentially formed on a polycarbonate substrate using the same film formation apparatus and the film formation method as those in Experimental Example 2, thus obtaining a magnetooptical recording medium of the present invention with a structure shown in FIG. 10D.

The composition of the GdFeCo reproduction layer was set, so that the reproduction layer was TM rich at room temperature and had a Curie temperature of 300° C. or higher. The composition of the TbFeCoAl auxiliary layer was set, so that the auxiliary layer was TM rich at room temperature and had a Curie temperature of 185° C., and $Hc^{RA}$ was set to be 4 kOe. The composition of the GeFeCo intermediate layer was set so that the intermediate layer was TM rich at room temperature and had a Curie temperature of 235° C. The composition of the TbFeCo first recording layer was set so that the first recording layer was RE rich at room temperature, had no compensation temperature and had a Curie temperature of 250° C. The composition of the TbFeCo second recording layer was set, so that the second recording layer was TM rich at room temperature and had a Curie temperature of 250° C.

The recording/reproduction characteristics were measured using this magnetooptical recording medium as in Experimental Example 1. Table 1 and FIG. 11 (symbol 3) show the measurement results.

(EXPERIMENTAL EXAMPLE 4)

An 800-Å thick SiN dielectric layer, a 100-Å thick GdFeCo reproduction layer, a 50-Å thick TbFeCoAl auxiliary layer, a 50-Å thick GdFeCo intermediate layer, a 50-Å thick TbFeCo first recording layer, a 20-Å thick SiN cutting-off layer, a 150-Å thick TbFeCo second recording layer, a 300-Å thick SiN interference layer, and a 600-Å Al reflective layer were sequentially formed on a polycarbonate substrate using the same film formation apparatus and the film formation method as those in Experimental Example 2, thus obtaining a magnetooptical recording medium of the present invention with a structure shown in FIG. 10D.

The composition of the GdFeCo reproduction layer was set, so that the reproduction layer was TM rich at room temperature and had a Curie temperature of 300° C. or higher. The composition of the TbFeCoAl auxiliary layer was set, so that the auxiliary layer was TM rich at room temperature and had a Curie temperature of 170° C., and $Hc^{RA}$ was set to be 3 kOe. The composition of the GdFeCo intermediate layer was set so that the intermediate layer was TM rich at room temperature and had a Curie temperature of 260° C. The composition of the TbFeCo first recording layer was set so that the first recording layer was RE rich at room temperature, had a compensation temperature of 220° C., and had a Curie temperature of 250° C. The composition of the TbFeCo second recording layer was set, so that the second recording layer was TM rich at room temperature, had no compensation temperature and had a Curie temperature of 250° C.

The recording/reproduction characteristics were measured using this magnetooptical recording medium as in Experimental Example 1. Table 1 and FIG. 11 (symbol 4) show the measurement results.

(EXPERIMENTAL EXAMPLE 5)

An 800-Å thick SiN dielectric layer, a 100-Å thick GdFeCo reproduction layer, a 50-Å thick TbFeCoAl auxiliary layer, a 50-Å thick GdFeCo intermediate layer, a 50-Å thick TbFeCo first recording layer, a 20-Å thick SiN cutting-off layer, a 150-Å thick TbFeCo second recording layer, a 300-Å thick SiN interference layer, and a 600-Å Al reflective layer were sequentially formed on a polycarbonate substrate using the same film formation apparatus and the film formation method as those in Experimental Example 2, thus obtaining a magnetooptical recording medium of the present invention with a structure shown in FIG. 10B.

The composition of the GdFeCo reproduction layer was set, so that the reproduction layer was TM rich at room temperature and had a Curie temperature of 300° C. or higher. The composition of the TbFeCoAl auxiliary layer was set, so that the auxiliary layer was TM rich at room temperature and had a Curie temperature of 140° C., and $Hc^{RA}$ was set to be 3 kOe. The composition of the GeFeCo intermediate layer was set so that the intermediate layer was TM rich at room temperature and had a Curie temperature of 260° C. The composition of the TbFeCo first recording layer was set so that the first recording layer was RE rich at room temperature, had no compensation temperature and had a Curie temperature of 250° C. The composition of the TbFeCo second recording layer was set, so that the second recording layer was TM rich at room temperature, and had a Curie temperature of 250° C.

The recording/reproduction characteristics were measured using this magnetooptical recording medium as in Experimental Example 1. Table 1 and FIG. 11 (symbol 5) show the measurement results.

(COMPARATIVE EXPERIMENTAL EXAMPLE 1)

Figure 12:
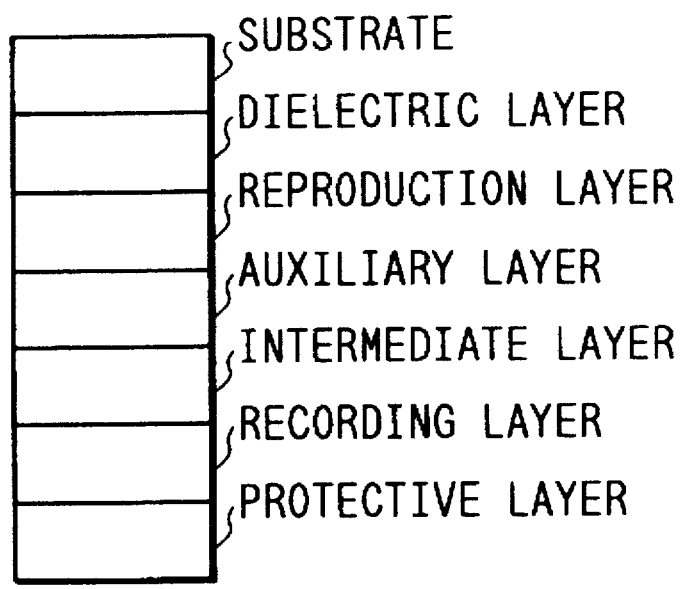
FIG. 12 is a view showing a film structure of Comparative Experimental Example 1.

An 800-Å thick SiN dielectric layer, a 300-Å thick GdFeCo reproduction layer, a 100-Å thick TbFeCoAl aux- iliary layer, a 150-Å thick GdFeCo intermediate layer, a 400-Å thick TbFeCo recording layer, and a 700-Å thick SiN protective layer were sequentially formed on a polycarbonate substrate using the same film formation apparatus and the film formation method as those in Experimental Example 2, thus obtaining a conventional magnetooptical recording medium with a structure shown in FIG. 12.

The composition of the GdFeCo reproduction layer was set, so that the reproduction layer was TM rich at room temperature and had a Curie temperature of 300° C. or higher. The composition of the TbFeCoAl auxiliary layer was set, so that the auxiliary layer was TM rich at room temperature and had a Curie temperature of 140° C., and $Hc^{RA}$ was set to be 4 kOe. The composition of the GeFeCo intermediate layer was set so that the intermediate layer was TM rich at room temperature and had a Curie temperature of 260° C. The composition of the TbFeCo recording layer was set so that the recording layer was RE rich at room temperature, had no compensation temperature and had a Curie temperature of 250° C.

The recording/reproduction characteristics were measured using this magnetooptical recording medium as in Experimental Example 1. Table 1 and FIG. 11 (symbol R) show the measurement results.

As can be seen from a comparison of the result of this example with those of Experimental Examples 2 to 5, in the magnetooptical recording media of the present invention, even when the film thickness of the magnetic layer is small, super-resolution recording/reproduction can be realized at a C/N ratio of 45 dB or higher for a mark length of 0.4 µm, and even when the linear velocity becomes higher, required laser power does not become so large as compared to the comparative example. Since the maximum output, on the medium surface, of a semiconductor laser used in an existing magnetooptical recording apparatus is about 10 mW, the maximum linear velocity in the conventional magnetooptical recording medium of the comparative example is 17 m/s. However, in the experimental examples of the present invention, the linear velocity can be improved up to about 25 m/s, and when the output of the semiconductor laser is improved in the future, the difference between recording sensitivities of the present invention and the prior art is expected to increase even more. Therefore, the magnetooptical recording medium of the present invention can achieve high-speed recording as compared to the prior art.

TABLE 1

| Mark Length µm | C/N (dB) | | Recording Power (mW) | | | | | Total Film Thickness of |
|---|---|---|---|---|---|---|---|---|
| Linear Velocity | 0.78 | 0.40 | 0.78 | | | | | Magnetic |
| m/s | 10 | 10 | 5 | 10 | 15 | 20 | 25 | Films (Å) |
| Experimental Example 2 | 48 | 45 | 6.0 | 7.1 | 8.2 | 9.3 | 10.3 | 256 |
| Experimental Example 3 | 49 | 45 | 6.0 | 6.9 | 8.1 | 9.2 | 9.9 | 356 |
| Experimental Example 4 | 50 | 47 | 5.9 | 6.9 | 7.9 | 9.0 | 9.8 | 400 |
| Experimental Example 5 | 50 | 47 | 5.9 | 7.0 | 8.0 | 9.2 | 10.1 | 400 |
| Comparative Experimental Example 1 | 48 | 45 | 6.1 | 8.0 | 9.8 | 11.5 | 13.5 | 900 |

(Second Embodiment)

A magnetooptical recording medium and a reproduction method using the medium according to the second embodiment of the present invention will be described in detail below with reference to the accompanying drawings.

As described above, a recording layer in a magnetooptical recording medium of the present invention has a two-layered film structure. In the following description, of the two-layered films, one layer on the light incidence side will be referred to as a first recording layer hereinafter, the other layer will be referred to as a second recording layer hereinafter, and the recording layer will indicate these layers as a whole.

Figure 13:
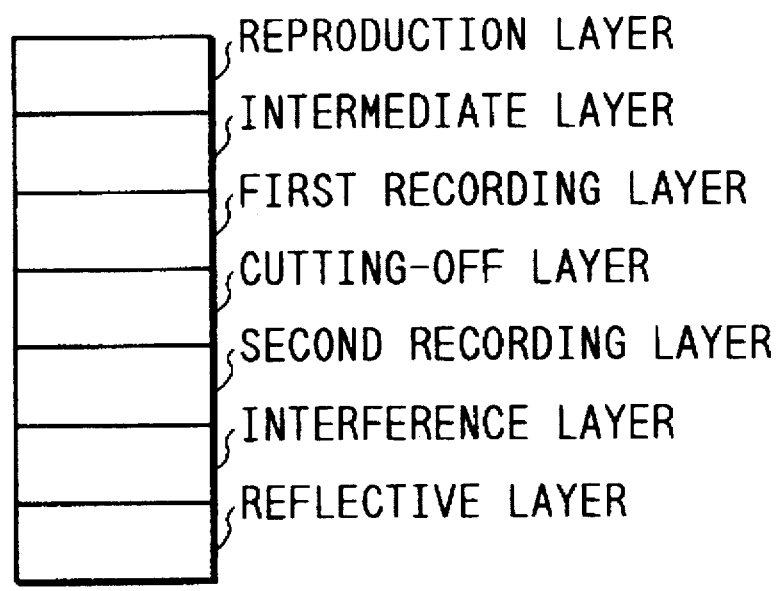
FIG. 13 is a view showing a film structure of a magnetooptical recording medium according to the second embodiment of the present invention.

As shown in, e.g., FIG. 13, the magnetooptical recording medium of the second embodiment is constituted by stacking a reproduction layer, an intermediate layer, a first recording layer, a cutting-off layer, a second recording layer, an interference layer, and a reflective layer. Of these layers, the cutting-off layer, the interference layer, and the reflective layer need not always be arranged. The intermediate layer need not always be arranged, either. However, when the intermediate layer is not arranged, interface magnetic wall energy between the reproduction layer and the first recording layer must be kept sufficiently small in a high-temperature portion upon reproduction by performing a plasma treatment in a residual gas atmosphere after formation of the reproduction layer.

The reproduction layer preferably consists of, e.g., a rare earth-iron group amorphous alloy, for example, GdCo, GdFeCo, TbFeCo, GdTbFeCo, GdDyFeCo, NdGdFeCo, or the like. When the thickness of the reproduction layer becomes equal to or smaller than 50 Å, a sufficiently strong reproduced signal cannot be obtained. For this reason, each of layers which contribute to the reproduced signal (the reproduction layer and a layer (the intermediate layer in the second embodiment) adjacent to the reproduction layer and having a sub lattice magnetic moment in the same direction as that of the reproduction layer in a reproduction region upon reproduction if such a layer is present) preferably has a thickness of 80 Å or more, and more preferably, a thickness of 100 Å or more. If the thickness of each of these layers becomes larger than 300 Å, the effect of the present invention is reduced. For this reason, the thickness of each of the layers is preferably equal to or smaller than 300 Å and, more preferably, equal to or smaller than 200 Å.

Conditions of the reproduction magnetic field, coercive force, and the like for realizing magnetic super-resolution are as follows when Hr is the reproduction magnetic field, $Hw^R$ is the effective magnetic field acting on the reproduction layer by magnetic coupling, $Hc^R$ is the coercive force of the reproduction layer, Ta is the ambient temperature, Tm is the mask temperature, Tmax is the maximum temperature, and T is the medium temperature.

In order to transfer magnetization information in the recording layer at the ambient temperature Ta to the reproduction layer (Formula 15) must be satisfied:

$$Hc^R < Hw^R \text{ at } T=Ta \quad \text{(Formula 15)}$$

where $Hw^R$ is given by (Formula 16) below:

$$Hw^R = \frac{\sigma w^{RM1}}{2Ms^R h^R} \quad \text{(Formula 16)}$$

where $h^R$ is the film thickness of the reproduction layer, $Ms^R$ is the saturation magnetization of the reproduction layer, and $\sigma w^{RM1}$ is the interface magnetic wall energy between the reproduction layer and the first recording layer. When an intermediate layer is inserted, the interface magnetic wall energy $\sigma w^{RM1}$ has a value obtained via the intermediate layer.

The magnetization of the reproduction layer must satisfy (Formula 17) below to follow the direction of a reproduction magnetic field in a high-temperature region equal to or higher than Tm in a light spot.

$$Hr > Hc^R + Hw^R \text{ at } T>Tm \quad \text{(Formula 17)}$$

The intermediate layer is used for easily cutting off exchange coupling between the reproduction layer and the recording layer at a temperature equal to or higher than Tm. For this purpose, the intermediate layer must have a Curie temperature falling within a range from 100° C. to 180° C., and a thickness of at least 5 Å or more. The intermediate layer preferably has a thickness of 10 Å or more, and more preferably, 20 Å or more.

The intermediate layer must not be influenced by the reproduction magnetic field before the medium temperature reaches Tm. Therefore, (Formula 18) must be satisfied.

$$Hr < Hc^R + Hw^R \text{ at } T<Tm \quad \text{(Formula 18)}$$

The first and second recording layers constituting the recording layer preferably consist of a material which has a large perpendicular magnetic anisotropy and can stably maintain a magnetization state, for example, a rare earth-iron group amorphous alloy (e.g., TbFeCo, DyFeCo, TbDyFeCo, or the like), garnet, or a platinum group-iron group periodic structure film, e.g., a Pt/Co or Pd/Co platinum group-iron group alloy (e.g., PtCo, PdCo, or the like).

As the film thickness of the recording layer, each of the first and second recording layers preferably has a thickness not less than 20 Å but less than 300 Å. In order to cancel the rotation of the plane of polarization on the recording layer, the first recording layer near the incident side preferably has a thickness smaller than that of the second recording layer since it largely influences the rotation of the plane of polarization, when the first and second recording layers have almost the same complex indices of refraction.

As the composition of the recording layer, when a recording layer consisting of a ferrimagnetic rare earth (RE)-iron group transition metal (TM) alloy is used, the following two different compositions are available. In one composition, the recording layer is prepared by stacking two layers, i.e., a magnetic layer of the first type, which is rare earth element dominant at room temperature, and does not have a compensation temperature between room temperature and the Curie temperature, and a magnetic layer of the second type, which is iron group transition metal dominant at room temperature (not having a compensation temperature between room temperature and the Curie temperature) (to be referred to as A type hereinafter). In the other composition, the recording layer is prepared by stacking two different layers, i.e., a magnetic layer of the third type which is rare earth element dominant at room temperature, and has a compensation temperature between room temperature and the Curie temperature, and a magnetic layer of the fourth type, which is rare earth element dominant at room temperature, and does not have a compensation temperature between room temperature and the Curie temperature (to be referred to as P type hereinafter).

In either the A- or P-type recording layer, the Curie temperatures of the first and second recording layers are preferably set to be almost equal to each other although they need not always be exactly equal to each other.

The sub lattice magnetic moments of the first and second recording layers must be oriented in the opposite directions. For this purpose, the effective magnetic field by magnetic coupling caused between these magnetic layers can be set to be smaller than the coercive forces of the respective layers. More specifically, if $Hw^{M1}$ is the effective magnetic field acting on the first recording layer by magnetic coupling with the second recording layer, $Ms^{M1}$ is the saturation magnetization of the first recording layer, $h^{M1}$ is the film thickness of the first recording layer, $Hc^{M1}$ is the coercive force of the first recording layer, $Hw^{M2}$ is the effective magnetic field acting on the second recording layer by magnetic coupling with the first recording layer, $Ms^{M2}$ is the saturation magnetization of the second recording layer, $h^{M2}$ is the film thickness of the second recording layer, and $Hc^{M2}$ is the coercive force of the second recording layer, (Formula 19) and (Formula 20) must be satisfied if the effective magnetic field by magnetic coupling with the reproduction layer is ignored.

$$Hw^{M1} < Hc^{M1} \quad \text{(Formula 19)}$$

$$Hw^{M2} < Hc^{M2} \quad \text{(Formula 20)}$$

where $Hw^{M1}$ and $Hw^{M2}$ are respectively given by (Formula 21) and (Formula 22).

$$Hw^{M1} = \frac{\sigma w^{M1M2}}{2Ms^{M1}h^{M1}} \quad \text{(Formula 21)}$$

$$Hw^{M2} = \frac{\sigma w^{M1M2}}{2Ms^{M2}h^{M2}} \quad \text{(Formula 22)}$$

where $\sigma w^{M1M2}$ is the interface magnetic wall energy between the first and second recording layers. When the cutting-off layer is inserted, the interface magnetic wall energy has a value obtained via the cutting-off layer.

The magnetic wall energy ow has a value as large as about 3 to 4 erg/cm² between magnetic layers such as TbFeCo layers each having a large perpendicular magnetic anisotropy. For this reason, the film thickness of each layer must be increased. However, the exchange coupling force between the first and second recording layers can be decreased or cut off without increasing the film thickness by inserting, between the first and second recording layers, a magnetic layer having a small perpendicular magnetic anisotropy, a magnetic layer which has a longitudinal magnetic anisotropy in which the longitudinal magnetic component is larger than the perpendicular magnetic component with respect to the substrate surface, a dielectric layer, or a non-magnetized metal layer.

This is the role of the cutting-off layer. The interface magnetic wall energy ow becomes as small as about 1 to 2 erg/cm² if a magnetic layer having a small perpendicular magnetic anisotropy, e.g., a GdFeCo film is used. Furthermore, in order to cut off exchange coupling between the first and second recording layers, the cutting-off layer can be set to consist of a dielectric such as SiN, AlN$_x$, AlO$_x$, TaO$_x$, SiO$_n$, or the like. These dielectrics can almost completely cut off the exchange coupling interaction when they have a thickness of 10 to 20 Å or more. Since the exchange interaction need not occur between the first and second recording layers, the above-mentioned dielectric is more preferably used as the cutting-off layer.

In order to preserve magnetization information of the first recording layer during reproduction, if $Hw^{M1R}$ is the effective magnetic field acting on the first recording layer by magnetic coupling with the reproduction layer, (Formula 23) below must be satisfied at the maximum temperature Tmax or lower.

$$Hr < Hc^{M1} - Hw^{M1R} \text{ at } T<Tmax \quad \text{(Formula 23)}$$

In order to preserve magnetization information of the second magnetic layer during reproduction, (Formula 24) must be satisfied at the maximum temperature Tmax or less upon reproduction.

$$Hr < Hc^{M2} - Hw^{M2} \text{ at } T<Tmax \quad \text{(Formula 24)}$$

In (Formula 23) and (Formula 24) above, it is assumed that ($Hw^{M1}$ and $Hw^{M2}$ are 0) in (Formula 23) and (Formula 24) when magnetic coupling between the first and second recording layers is cut off by adopting, e.g., a dielectric layer as the cutting-off layer.

Note that elements such as Cr, Al, Ti, Pt, Nb, and the like for improving corrosion resistance may be added to the reproduction layer, the intermediate layer, and the recording layer.

When incident light is transmitted through the recording layer, the reflective layer may be arranged on a surface, opposite to the incident surface, of the recording layer to prevent a decrease in returned light amount by reflecting the incident light and to enhance the incident light between the magnetic layer and the reflective layer. In addition to the reflective layer, a dielectric layer consisting of, e.g., SiN, AlN$_x$, AlO$_x$, TaO$_x$, SiO$_x$, or the like may be arranged as the interference layer between the second recording layer and the reflective layer so as to improve the interference effect. The interference layer must have a film thickness that can cancel $\theta_K$ in the recording layer and can obtain a desired reflectance. Alternatively, for the purpose of improving the magnetic domain shape upon execution of a magnetic field modulation overwrite operation, a heat conductive layer may be arranged to improve heat conductivity. The reflective layer and the heat conductive layers may consist of Al, AlTa, AlTi, AlCr, Cu, or the like. The reflective layer must have a small thickness, so that light can be sufficiently reflected and the reflective layer and the heat conductive layer must have a small thickness, so that optical power can be prevented from becoming too large. The heat conductive layer and the reflective layer may be constituted by a single layer. Furthermore, the dielectric layer or a protective coat consisting of a polymer resin may be added as a protective layer.

Note that the method of recording information in the recording layer of the magnetooptical recording medium according to the second embodiment of the present invention is the same as that in the first embodiment.

A reproduction method of the magnetooptical recording medium according to the second embodiment of the present invention will be described below.

First, the medium is rotated. While irradiating a light spot onto the medium, a reproduction magnetic field 9 is applied to the portion irradiated by the light spot.

Figure 14A:
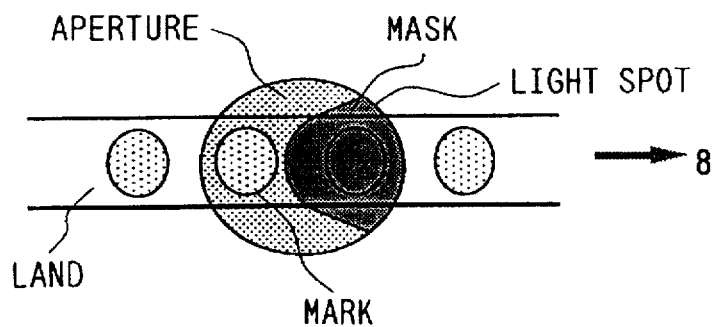
FIG. 14A is a view showing an aperture and a mask in a light spot.
Figure 14B:
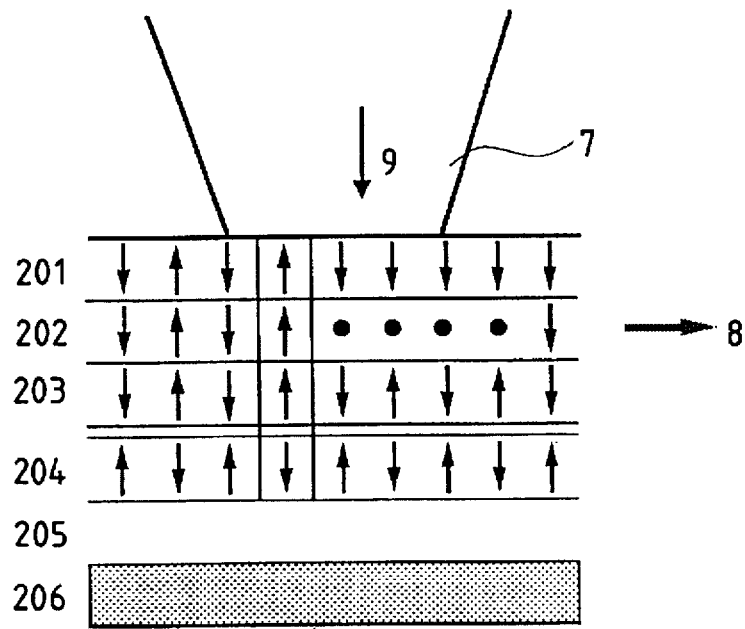
FIG. 14B is a view showing an example of a film structure of a magnetooptical recording medium according to the present invention, and a magnetization state upon reproduction.
Figure 14C:
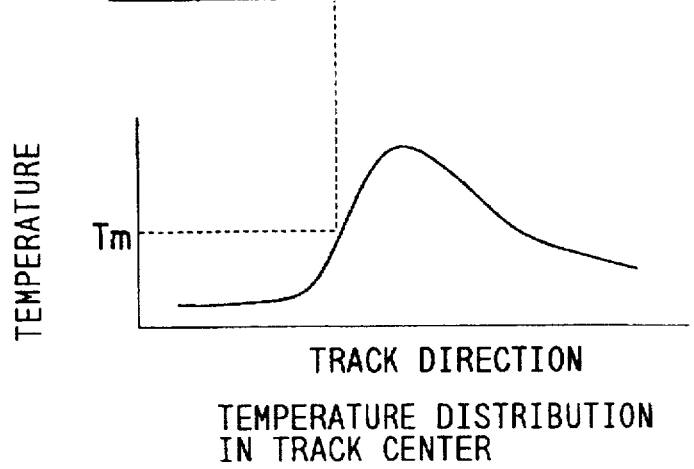
FIG. 14C is a graph showing the temperature distribution of the medium upon reproduction.

At this time, as shown in FIGS. 14B and 14C, since the exchange coupling force acts between a reproduction layer 201 and a first recording layer 203 at room temperature and in a low-temperature portion (T<Tm) in the light spot, the magnetization of the reproduction layer 201 transfers magnetic domain information in the first recording layer 203 to follow a stable direction with respect to the direction of magnetization based on information in the first recording layer 203. However, in a high-temperature portion (T>Tm), since the temperature of an intermediate layer 202 has reached its Curie temperature, and the exchange coupling force from the first recording layer 203 disappears, the magnetization of the reproduction layer 201 is always oriented in one direction by the reproduction magnetic field 9. For this reason, in a light spot 7, as shown in FIG. 14A, an aperture portion from which a recorded mark is detected and a mask portion from which no recorded mark is detected are formed.

When a magnetooptical change in light reflected by the medium (i.e., a change in Kerr rotation angle) is detected, information transferred to the reproduction layer is reproduced.

Since the same kinds of sub lattice magnetic moments are oriented in the opposite directions in the first recording layer 203 and a second recording layer 204, the plane of polarization of light transmitted through the reproduction layer 201 is rotated by the first recording layer 203 and is then rotated in the opposite direction by the second recording layer 204. Thereafter, the light returns to the magnetooptical recording apparatus. For this reason, if the rotation angle of the plane of polarization polarized by the first recording layer 203 is set to be equal to the rotation angle of the plane of polarization polarized by the second recording layer 204, the Kerr rotation angle is not influenced by these recording layers. Therefore, light which is transmitted through the reproduction layer and is reflected by the second recording layer 204 or a reflective layer 206 has only rotation of the plane of polarization influenced by the magnetooptical effect of the reproduction layer. In other words, even when the incident light is transmitted through the reproduction layer 201, magnetic domain information of the recording layer is not detected. In this case, the reflective layer 206 may be directly stacked on the second recording layer 204. However, as shown in FIG. 14B, an interference layer 205 consisting of a dielectric is inserted between the second recording layer 204 and the reflective layer 206 to realize an enhance structure for increasing $\theta_K$. Alternatively, the second recording layer 204 may be formed to be relatively thick without forming the reflective layer 206, so as to reflect sufficient light, and the Kerr rotation angle may be canceled by the first and second recording layers 203 and 204.

Since the magnetooptical recording medium of the present invention do not require masking of magnetization information of the recording layer using the reproduction layer and a layer having a sub lattice magnetic moment in the same direction as the reproduction layer, the thicknesses of these layers can be reduced to a degree not to deteriorate the reproduced signal. Therefore, the film thickness of the magnetic layer can be greatly decreased as compared to the prior art.

The second embodiment of the present invention will be described in more detail below by way of its experimental examples. However, the present invention is not limited to the following experimental examples if intended changes fall within the scope of the present invention.

(EXPERIMENTAL EXAMPLE 6)

Figure 15B:
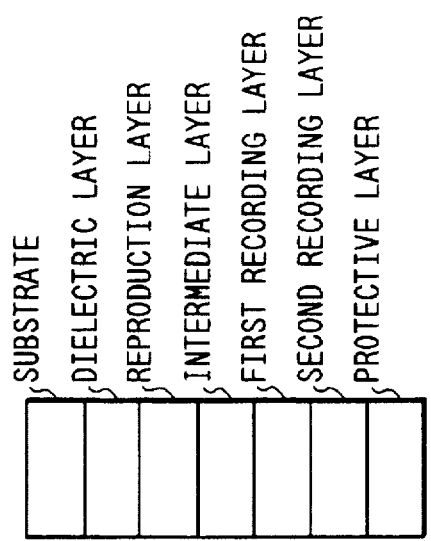
FIGS. 15A to 15D are views showing film structures of experimental examples of magnetooptical recording media according to the second embodiment of the present invention.
Figure 15D:
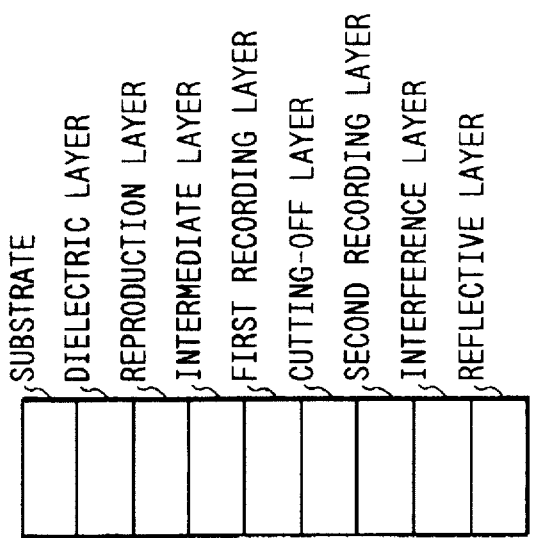
Figure 15A:
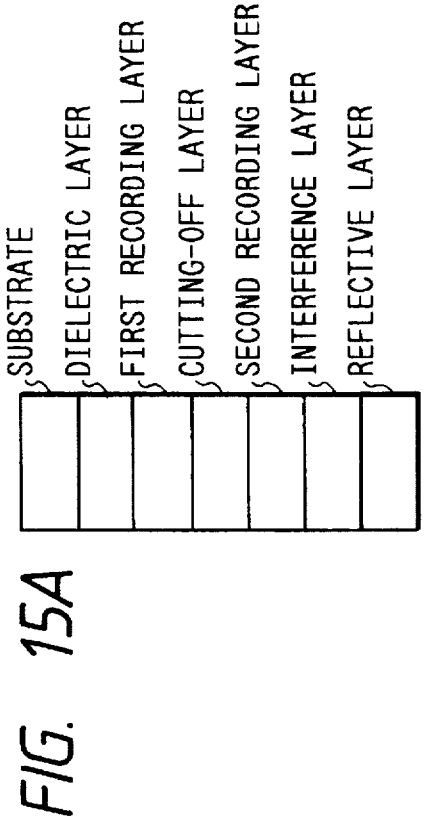

Following the same procedures as in Experimental Example 1, Si, Tb, Gd, Fe, Co, and Al targets were attached to a DC magnetron sputtering apparatus, and an 800-Å thick SiN dielectric layer, a 100-Å thick GdFeCo reproduction layer, a 50-Å thick TbFeCoAl intermediate layer, a 27-Å thick TbFeCo first recording layer, a 100-Å thick TbFeCo second recording layer, and a 700-Å thick SiN protective layer were sequentially formed on a pre-grooved polycarbonate substrate having a diameter of 130 mm, thus obtaining a magnetooptical recording medium of the present invention with a structure shown in FIG. 15D.

The composition of the GdFeCo reproduction layer was set, so that the reproduction layer was TM rich at room temperature and had a Curie temperature of 300° C. or higher. The composition of the TbFeCoAl layer was set, so that the intermediate layer was TM rich at room temperature and had a Curie temperature of 140° C. The composition of the TbFeCo first recording layer was set so that the first recording layer was RE rich at room temperature, had no compensation temperature and had a Curie temperature of 250° C. The composition of the TbFeCo second recording layer was set, so that the second recording layer was TM rich at room temperature and had a Curie temperature of 250° C.

This magnetooptical recording medium was rotated at a rotational speed of 2,600 rpm, an RF signal of 12.5 MHz was written at a radial position of 37 mm to have a recorded mark length of 0.40 μm, and an RF signal of 6.4 MHz was written to have a recorded mark length of 0.78 μm. The linear velocity of the medium at that time was 10 m/s. Thereafter, a reproduction magnetic field of 400 Oe was applied to measure the C/N ratios obtained with the respective mark lengths. An objective lens of an optical head had an NA of 0.55, and the laser wavelength was 780 nm.

Signals of 3.2 MHz, 9.6 MHz, and 12.8 MHz were recorded to have a mark length of 0.78 μm, while changing stepwise the linear velocity to 5 m/s (rotational speed=1,300 rpm and radial position=37 mm), 15 m/s (rotational speed=3,600 rpm and radial position=40 mm), 20 m/s (rotational speed=3,600 rpm and radial position=54 mm), and 25 m/s (rotational speed=3,980 rpm and radial position=60 mm), and a minimum recording power level Pw which could yield a C/N ratio of 48 dB was obtained. The reproduction power level was set to have values (2.5 to 3.5 mW) corresponding to the maximum C/N ratios at the corresponding recording power levels.

Figure 16:
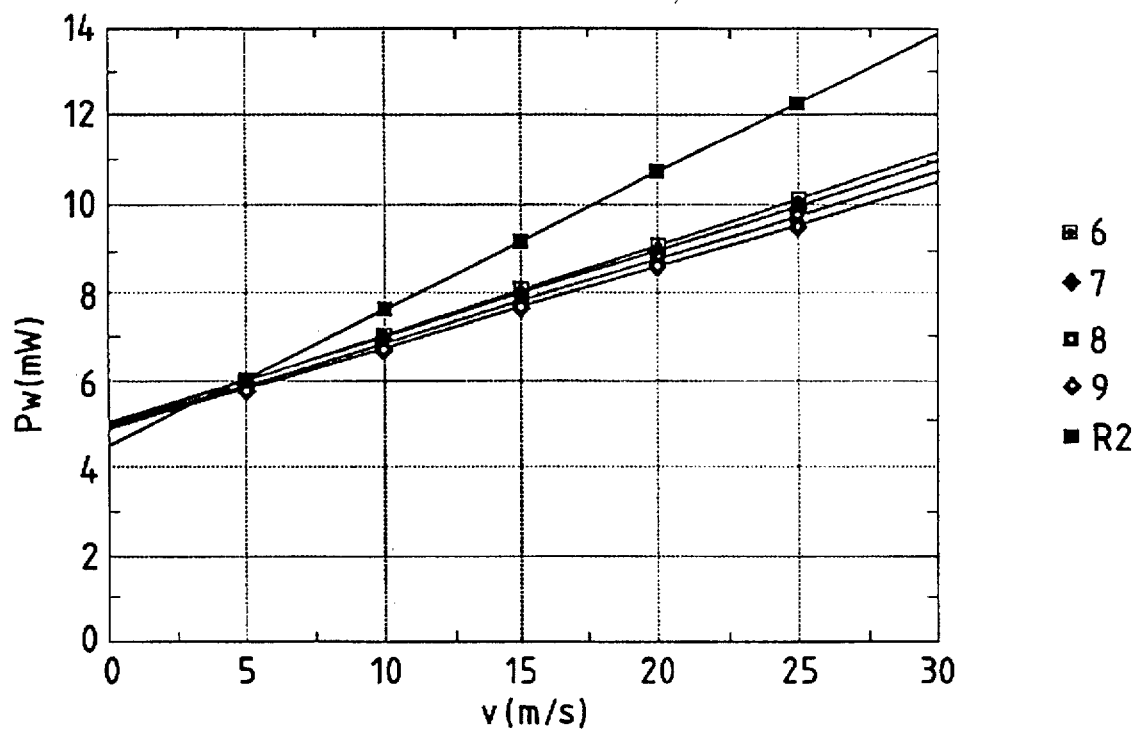
FIG. 16 is a graph showing the relationship between the recording power and the linear velocity in the experimental examples and a comparative experimental example of the second embodiment of the present invention.

Table 2 and FIG. 16 (symbol 6) show the measurement results.

(EXPERIMENTAL EXAMPLE 7)

Figure 15C:
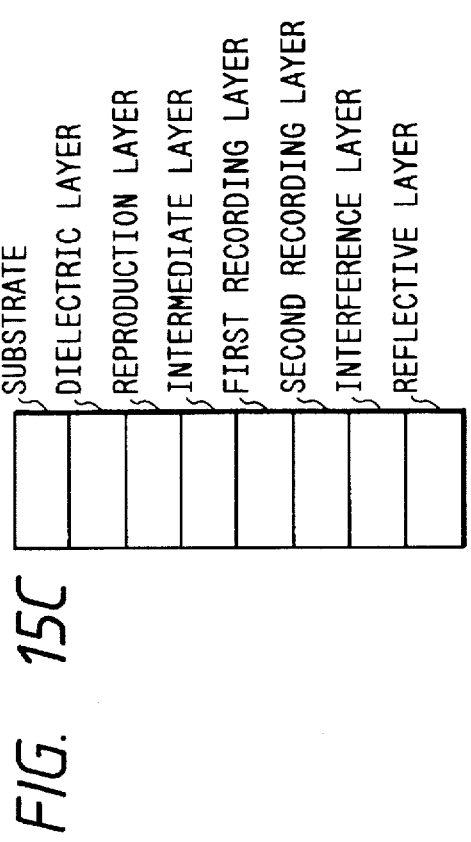

An 800-Å thick SiN dielectric layer, an 80-Å thick GdFeCo reproduction layer, a 20-Å thick TbFeCoAl intermediate layer, a 68-Å thick TbFeCo first recording layer, a 100-Å thick TbFeCo second recording layer, a 300-Å thick SiN interference layer, and a 600-Å Al reflective layer were sequentially formed on a polycarbonate substrate using the same film formation apparatus and the film formation method as those in Experimental Example 6, thus obtaining a magnetooptical recording medium of the present invention with a structure shown in FIG. 15C. The refractive index of each SiN layer was set to be 2.1.

The composition of the GdFeCo reproduction layer was set, so that the reproduction layer was TM rich at room temperature and had a Curie temperature of 300° C. or higher. The composition of the TbFeCoAl layer was set, so that the intermediate layer was TM rich at room temperature and had a Curie temperature of 140° C. The composition of the TbFeCo first recording layer was set so that the first recording layer was RE rich at room temperature, had no compensation temperature and had a Curie temperature of 250° C. The composition of the TbFeCo second recording layer was set, so that the second recording layer was TM rich at room temperature and had a Curie temperature of 250° C.

The recording/reproduction characteristics were measured using this magnetooptical recording medium as in Experimental Example 6. Table 2 and FIG. 16 (symbol 7) show the measurement results.

(EXPERIMENTAL EXAMPLE 8)

An 800-Å thick SiN dielectric layer, an 80-Å thick GdFeCo reproduction layer, a 20-Å thick TbFeCoAl intermediate layer, a 65-Å thick TbFeCo first recording layer, 20-Å thick SiN cutting-off layer, a 60-Å thick TbFeCo second recording layer, a 300-Å thick SiN interference layer, and a 600-Å al reflective layer were sequentially formed on a polycarbonate substrate using the same film formation apparatus and the film formation method as those in Experimental Example 6, thus obtaining a magnetooptical recording medium of the present invention with a structure shown in FIG. 15D. The refractive index of each SiN layer was set to be 2.1.

The composition of the GdFeCo reproduction layer was set, so that the reproduction layer was TM rich at room temperature and had a Curie temperature of 300° C. or higher. The composition of the TbFeCoAl layer was set, so that the intermediate layer was TM rich at room temperature and had a Curie temperature of 140° C. The composition of the TbFeCo first recording layer was set so that the first recording layer was RE rich at room temperature, had no compensation temperature and had a Curie temperature of 250° C. The composition of the TbFeCo second recording layer was set, so that the second recording layer was TM rich at room temperature and had a Curie temperature of 250° C.

The recording/reproduction characteristics were measured using this magnetooptical recording medium as in Experimental Example 6. Table 2 and FIG. 16 (symbol 8) show the measurement results.

(EXPERIMENTAL EXAMPLE 9)

An 800-Å thick SiN dielectric layer, a 100-Å thick GdFeCo reproduction layer, a 50-Å thick TbFeCoAl intermediate layer, a 46-Å thick TbFeCo first recording layer, 20-Å thick SiN cutting-off layer, a 60-Å thick TbFeCo second recording layer, a 300-Å thick SiN interference layer, and a 600-Å Al reflective layer were sequentially formed on a polycarbonate substrate using the same film formation apparatus and the film formation method as those in Experimental Example 1, thus obtaining a magnetooptical recording medium of the present invention with a structure shown in FIG. 15D. The refractive index of each SiN layer was set to be 2.1.

The composition of the GdFeCo reproduction layer was set, so that the reproduction layer was TM rich at room temperature and had a Curie temperature of 300° C. or higher. The composition of the TbFeCoAl layer was set, so that the intermediate layer was TM rich at room temperature and had a Curie temperature of 140° C. The composition of the TbFeCo first recording layer was set so that the first recording layer was RE rich at room temperature, had no compensation temperature and had a Curie temperature of 250° C. The composition of the TbFeCo second recording layer was set, so that the second recording layer was TM rich at room temperature and had a Curie temperature of 250° C.

The recording/reproduction characteristics were measured using this magnetooptical recording medium as in Experimental Example 6. Table 2 and FIG. 16 (symbol 9) show the measurement results.

(COMPARATIVE EXPERIMENTAL EXAMPLE 2)

Figure 17:
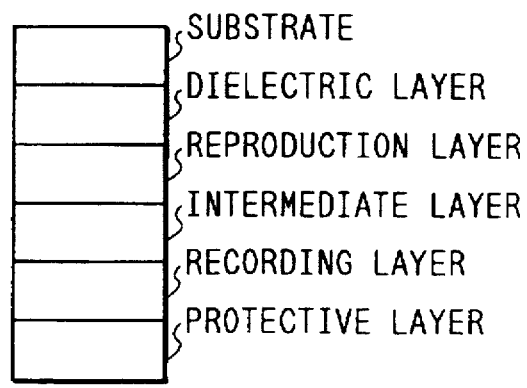
FIG. 17 is a view showing a film structure of Comparative Experimental Example 2.

An 800-Å thick SiN dielectric layer, a 300-Å thick GdFeCo reproduction layer, a 100-Å thick TbFeCoAl intermediate layer, a 400-Å thick TbFeCo recording layer, and a 700-Å thick SiN protective layer were sequentially formed on a polycarbonate substrate using the same film formation apparatus and the film formation method as those in Experimental Example 6, thus obtaining a conventional magnetooptical recording medium with a structure shown in FIG. 17. The refractive index of each SiN layer was set to be 2.1.

The composition of the GdFeCo reproduction layer was set, so that the reproduction layer was TM rich at room temperature and had a Curie temperature of 300° C. or higher. The composition of the TbFeCoAl layer was set, so that the intermediate layer was TM rich at room temperature and had a Curie temperature of 140° C. The composition of the TbFeCo first recording layer was set so that the recording layer was RE rich at room temperature, had no compensation and had a Curie temperature of 250° C. The composition of the TbFeCo second recording layer was set, so that the second recording layer was TM rich at room temperature and had a Curie temperature of 250° C.

The recording/reproduction characteristics were measured using this magnetooptical recording medium as in Experimental Example 6. Table 2 and FIG. 16 (symbol R1) show the measurement results.

As can be seen from a comparison of the result of this example with those of Experimental Examples 6 to 9, in the magnetooptical recording media of the present invention, even when the film thickness of the magnetic layer is small, super-resolution recording/reproduction can be realized at a C/N ratio of 45 dB or higher for a mark length of 0.4 μm, and even when the linear velocity becomes higher, required laser power does not become so large as compared to the comparative example. Since the maximum output, on the medium surface, of a semiconductor laser used in an existing magnetooptical recording apparatus is about 10 mW, the maximum linear velocity in the conventional magnetooptical recording medium of the comparative example is 17 m/s. However, in the experimental examples of the present invention, the linear velocity can be improved up to about 25 m/s, and when the output of the semiconductor laser is improved in the future, the difference between recording sensitivities of the present invention and the prior art is expected to increase even more. Therefore, the magnetooptical recording medium of the present invention can achieve high-speed recording as compared to the prior art.

TABLE 2

| Mark Length μm | C/N (dB) | | Recording Power (mW) | | | | | Total Film Thickness of |
|---|---|---|---|---|---|---|---|---|
| Linear Velocity | 0.78 | 0.40 | 0.78 | | | | | Magnetic |
| m/s | 10 | 10 | 5 | 10 | 15 | 20 | 25 | Films (Å) |
| Experimental Example 6 | 48 | 46 | 5.9 | 7.0 | 8.0 | 9.1 | 10.0 | 277 |
| Experimental Example 7 | 49 | 46 | 5.9 | 6.9 | 8.0 | 9.0 | 9.8 | 268 |
| Experimental Example 8 | 50 | 47 | 5.8 | 6.8 | 7.8 | 8.8 | 9.6 | 265 |
| Experimental Example 5 | 50 | 47 | 5.8 | 6.7 | 7.6 | 8.5 | 9.5 | 256 |
| Comparative Experimental Example 2 | 48 | 45 | 6.0 | 7.6 | 9.1 | 10.7 | 12.2 | 800 |

(Third Embodiment)

A magnetooptical recording medium and a reproduction method using the medium according to the third embodiment of the present invention will be described in detail below with reference to the accompanying drawings.

Figures 18A, 18B, 18C, 18D:
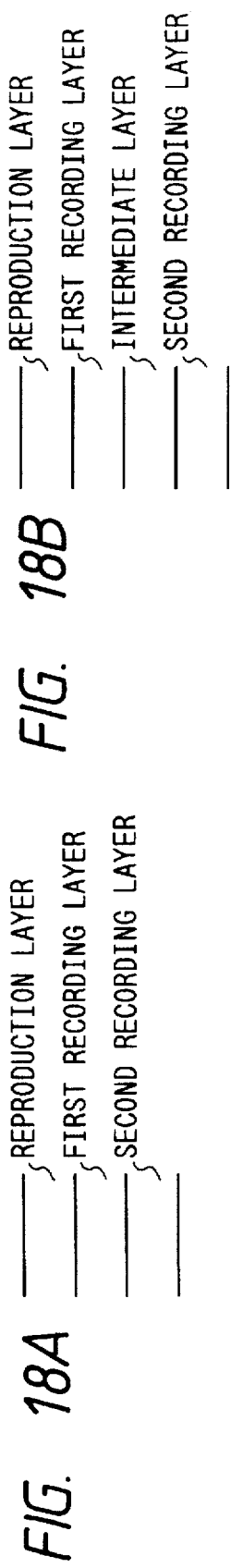
FIGS. 18A to 18D are views showing film structures of a magnetooptical recording medium according to the third embodiment of the present invention.

In a basic structure of a magnetooptical recording medium of the present invention, a recording layer adopts a two-layered film structure (first and second recording layers) including two perpendicular magnetic films which have sub lattice magnetic moments in the opposite directions, and a reproduction layer which is a longitudinal magnetic film at room temperature and becomes a perpendicular magnetic film upon temperature rise is stacked on the recording layer directly or via an intermediate layer (see FIG. 18A).

A magnetooptical recording medium according to the third embodiment of the present invention will be described in more detail below.

The reproduction layer preferably consists of, e.g., a rare earth-iron group amorphous alloy, for example, GdCo, GdFeCo, GdTbFeCo, GdDyFeCo, NdGdFeCo, or the like. Preferably, the reproduction layer comprises a film which has a small magnetic anisotropy and has a compensation temperature between room temperature and its Curie temperature.

The recording layer preferably consists of a material which has a large perpendicular magnetic anisotropy, and can stably hold a magnetization state, for example, a rare earth-iron group amorphous alloy (e.g., TbFeCo, DyFeCo, TbDyFeCo, or the like), garnet, or a platinum group-iron group periodic structure film, e.g., a Pt/Co or Pd/Co platinum group-iron group alloy (e.g., PtCo, PdCo, or the like).

Note that elements such as Cr, Al, Ti, Pt, Nb, and the like for improving corrosion resistance may be added to the reproduction layer and the recording layer.

In addition to the reproduction layer and the recording layer, in order to enhance the interference effect, a dielectric such as $SiN_x$, $AlN_x$, $AlO_x$, $TaO_x$, $SiO_x$, or the like may be added.

Furthermore, a reflective layer (see FIGS. 18C and 18D) or a layer consisting of Al, AlTa, AlTi, AlCr, Cu, or the like to improve heat conductivity may be arranged. Also, an intermediate layer (see FIG. 18B) for adjusting the exchange coupling force or static magnetic coupling force, and an auxiliary layer for assisting recording and reproduction may be arranged. For example, when an intermediate layer having a Curie temperature lower than those of the reproduction layer and the recording layer is arranged, as shown in FIG. 18B, a structure for reproducing recorded information by only a middle-temperature portion as in the first embodiment without using a reproduction magnetic field can be realized since the reproduction layer becomes a longitudinal magnetic film again in a maximum-temperature portion. Furthermore, the above-mentioned dielectric layer or a protective coat consisting of a polymer resin may be added as a protective layer.

A case will be described below wherein a ferrimagnetic rare earth (RE)-iron group transition metal (TM) alloy is used as the recording layer.

When the first and second recording layers are ferrimagnetic layers, a recording layer in which the dominant magnetizations of both the first and second recording layers are a rare earth element or an iron group element will be referred to as a P-type recording layer, and a recording layer in which the dominant magnetization of the first recording layer is a rare earth element and that of the second recording layer is an iron group element or vice versa will be referred to as an A-type recording layer. The recording layer can be either of the following types (1) and (2). (1) A Type A recording layer consists of two layers obtained by stacking a magnetic layer (first recording layer) which is rare earth element dominant at room temperature and does not have a compensation temperature between room temperature and the Curie temperature, and a magnetic layer (second recording layer) which is iron group transition metal dominant at room temperature (i.e., not having a compensation temperature between room temperature and the Curie temperature).

(2) P Type

A recording layer consists of two layers obtained by stacking a magnetic layer (first recording layer) which is rare earth element dominant at room temperature and has a compensation temperature between room temperature and the Curie temperature, and a magnetic layer (second recording layer) which is rare earth element dominant at room temperature and does not have a compensation temperature between room temperature and the Curie temperature. Alternatively, a recording layer may consist of two layers obtained by stacking a magnetic layer (first recording layer) which is rare earth element dominant at room temperature and has a compensation temperature between room temperature and the Curie temperature, and a magnetic layer (second recording layer) which is iron group ransition metal dominatant at room temperature.

In either type (1) or (2), the Curie temperatures (Tc) of the first and second recording layers are preferably set to be almost equal to each other although they need not always be exactly equal to each other.

Note that the method of recording information in the recording layer of the magnetooptical recording medium of the third embodiment is the same as that in the first embodiment.

In the first and second recording layers, since the sub lattice magnetic moments of the same kinds of elements are oriented in the opposite directions, the plane of polarization of incident light upon reproduction is rotated by the first recording layer, and is then rotated in the opposite direction by the second recording layer.

For this reason, under a specific condition, the rotation angle of the plane of polarization of reflected light becomes equal to that of incident light to the recording layer, and such reflected light returns to a detector. As a result, the Kerr rotation angle is not influenced by these recording layers.

A reproduction method of the magnetooptical recording medium according to the third embodiment of the present invention will be described below.

Figure 19:
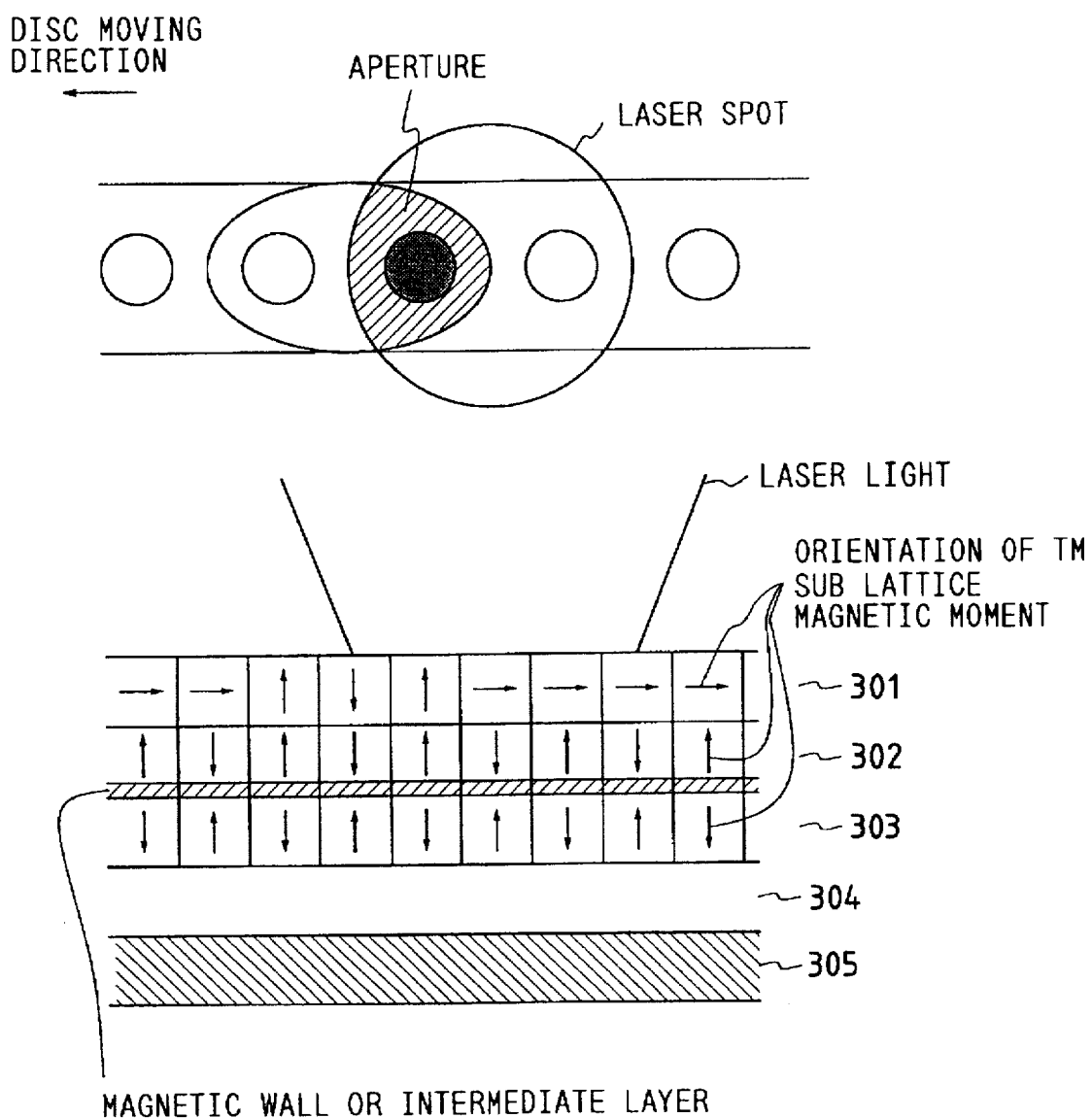
FIG. 19 is an explanatory view showing an information reproduction method according to the third embodiment of the present invention.

As shown in FIG. 19, when a light spot is irradiated from the reproduction layer side of a medium which is rotating upon reproduction, only a high-temperature portion in the light spot in the reproduction layer becomes a perpendicular magnetic film (it is possible to convert only a high-temperature portion in the light spot into a perpendicular magnetic film by adjusting the saturation magnetization Ms, perpendicular magnetic anisotropy Ku, exchange coupling force, and the like of the reproduction layer in consideration of the intensity of reproduction laser light). In this case, in the portion, converted into the perpendicular magnetic film, of the reproduction layer, an exchange coupling force with the recording layer acts, and the direction of magnetization of that portion of the reproduction layer follows a stable direction with respect to the direction of magnetization on the basis of information in the recording layer. Since a portion, other than the high-temperature portion, of the reproduction layer is still a longitudinal magnetic film, reflected light obtained by reflecting the light spot by the medium is influenced by a magnetooptical effect in only the perpendicular magnetic film portion of the reproduction layer, and its plane of polarization is changed in correspondence with the direction of magnetization. Therefore, by detecting the change in plane of polarization of the reflected light, information can be reproduced. On the other hand, the longitudinal magnetic film portion does not largely influence the plane of polarization of reflected light. Since the Kerr rotation angle is canceled in the recording layer, light transmitted through the reproduction layer and reflected by the recording layer or light further transmitted through the recording layer and reflected by the reflective layer has only rotation of the plane of polarization influenced by the magnetooptical effect of the reproduction layer. In other words, even when incident light is transmitted through the reproduction layer and masking is insufficient, magnetization of the recording layer will never be detected, and an enhance structure may be realized by arranging a reflective layer. Since the third embodiment does not require an initialization magnetic field or reproduction magnetic field unlike in the first and second embodiments, the apparatus can be rendered compact.

The third embodiment of the present invention will be described in more detail below by way of its experimental examples. However, the present invention is not limited to the following experimental examples if intended changes fall within the present invention.

(EXPERIMENTAL EXAMPLE 10)

Si, Tb, Gd, Fe, Co, and Al targets were attached to a DC magnetron sputtering apparatus, and a pre-grooved polycarbonate substrate having a diameter of 130 mm was fixed to a substrate holder. Thereafter, the interior of a chamber was vacuum-evacuated by a cryopump to a high vacuum of $1 \times 10^{-5}$ Pa or less.

Figure 20A:
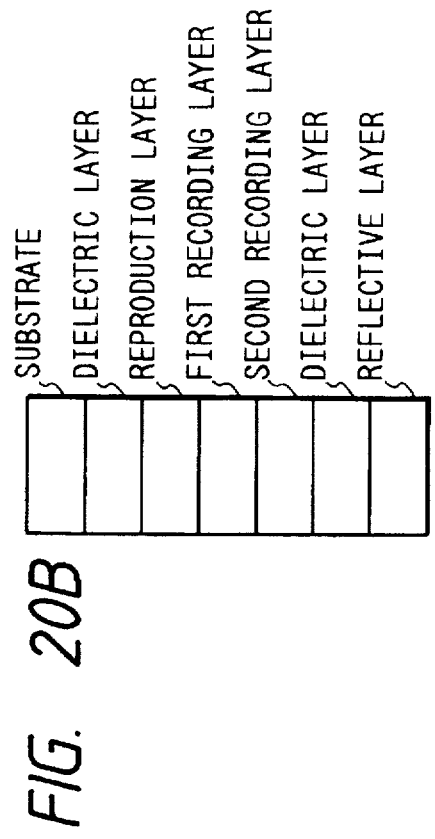
FIGS. 20A to 20C are views showing film structures in respective experimental examples of the third embodiment of the present invention.

While performing vacuum evacuation, Ar gas was supplied into the chamber up to 0.4 Pa, and thereafter, an 850-Å thick SiN layer as a dielectric layer, a 400-Å thick GdFeCo layer as a reproduction layer, a 200-Å thick TbFeCo layer as a first recording layer, a 200-Å thick TbFeCo layer as a second recording layer, and a 700-Å thick SiN layer as a protective layer were sequentially formed to obtain a magnetooptical recording medium having a structure shown in FIG. 20A.

Upon formation of the SiN layers, $N_2$ gas was supplied in addition to the Ar gas, and films were formed by a DC reactive sputtering method. The GdFeCo layer and the TbFeCo layers were formed by applying DC power to the Gd, Fe, Co, and Tb targets.

The composition of the GdFeCo reproduction layer was set so that the compensation temperature was 280° C. and the Curie temperature was 400° C. or higher.

The composition of the TbFeCo first recording layer was set so that the first recording layer was RE rich at room temperature, did not have a compensation temperature, and had a Curie temperature of 220° C., and a saturation magnetization of about 100 emu/cc at room temperature.

The composition of the TbFeCo second recording layer was set so that the second recording layer was TM rich at room temperature (the compensation temperature is equal to or lower than room temperature), and had a Curie temperature of 220° C., and a saturation magnetization of about 100 emu/cc at room temperature.

The recording/reproduction characteristics were measured using the magnetooptical recording medium.

The N.A. of an objective lens of a measurement apparatus was set to be 0.55, and the laser wavelength was set to be 780 nm. The recording power level was set to be 7 to 9 mW and the linear velocity was set to be 9 m/s (at a rotational speed of 2,400 rpm and a radial position of 36 mm). Under this condition, carrier signals of 5.8 to 15 MHz were written in the recording layer by a magnetic field modulation method, and the recording frequency dependence of the C/N ratio was examined. The applied magnetic field was set to be ±200 Oe.

The reproduction power level was set to have a value (1.5 to 3 mW) corresponding to a maximum C/N ratio. Table 1 shows the measurement results.

(EXPERIMENTAL EXAMPLE 11)

A magnetooptical recording medium having the following structure, film thicknesses, and compositions was prepared by forming thin films on a polycarbonate substrate using the same film formation apparatus and the film formation method as those in Experimental Example 10, and was evaluated under the same condition.

Figure 20B:
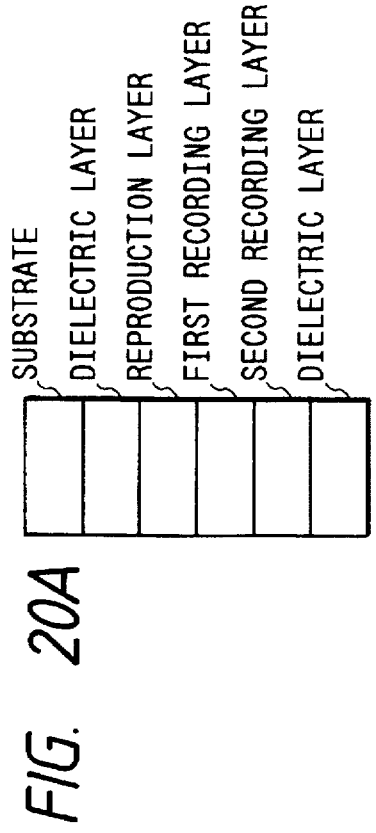

An 820-Å thick SiN layer as a dielectric layer, a 100-Å thick GdFeCo layer as a reproduction layer, a 68-Å thick TbFeCo layer as a first recording layer, a 100-Å thick TbFeCo layer as a second recording layer, a 300-Å thick SiN layer as a protective layer, and a 600-Å thick Al layer as a reflective layer were sequentially formed to obtain a structure shown in FIG. 20B.

The composition of the GdFeCo reproduction layer was set to have a compensation temperature of 280° C. and a Curie temperature of 400° C. or higher.

The composition of the TbFeCo first recording layer was set so that the first recording layer was RE rich at room temperature, did not have a compensation temperature, and had a Curie temperature of 220° C.

The composition of the TbFeCo second recording layer was set so that the second recording layer was TM rich at room temperature (the compensation temperature is equal to or lower than room temperature), and had a Curie temperature of 220° C.

Table 3 shows the measurement results.

(EXPERIMENTAL EXAMPLE 12)

A magnetooptical recording medium was prepared by forming thin films on a polycarbonate substrate using the same film formation apparatus and the film formation method as those in Experimental Example 10, and was evaluated under the same condition.

Figure 20C:
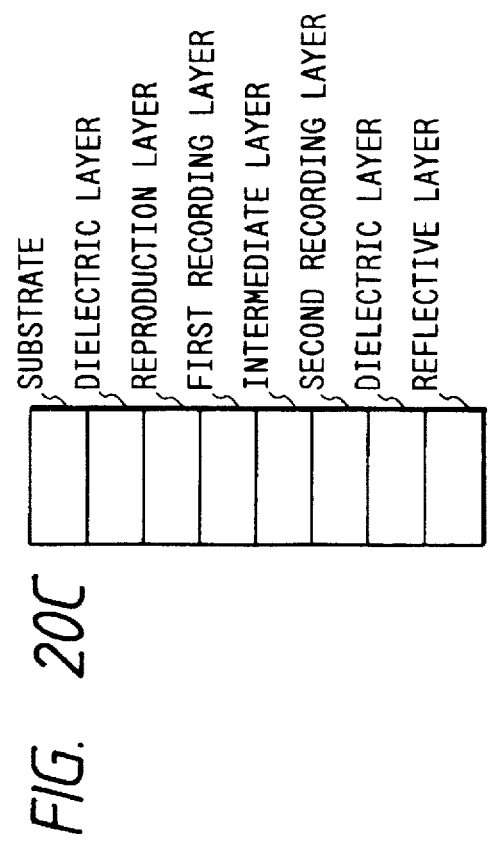

An 800-Å thick SiN layer as a dielectric layer, a 100-Å thick GdFeCo layer as a reproduction layer, a 56-Å thick TbFeCo layer as a first recording layer, a 50-Å thick SiN film as an intermediate layer, a 100-Å thick TbFeCo layer as a second recording layer, a 300-Å thick SiN layer as a protective layer, and a 600-Å thick Al layer as a reflective layer were sequentially formed to obtain a magnetooptical recording medium with a structure shown in FIG. 20C.

The composition of the GdFeCo reproduction layer was set to have a compensation temperature of 300° C. and a Curie temperature of 400° C. or higher.

The composition of the TbFeCo first recording layer was set so that the first recording layer was RE rich at room temperature, did not have a compensation temperature, and had a Curie temperature of 200° C.

The composition of the TbFeCo second recording layer was set so that the second recording layer was TM rich at room temperature (the compensation temperature is equal to or lower than room temperature), and had a Curie temperature of 150° C.

Table 3 shows the measurement results.

(EXPERIMENTAL EXAMPLE 13)

A magnetooptical recording medium was prepared by forming thin films on a polycarbonate substrate using the same film formation apparatus and the film formation method as those in Experimental Example 10, and was evaluated under the same condition.

An 830-Å thick SiN layer as a dielectric layer, a 200-Å thick GdFeCo layer as a reproduction layer, a 56-Å thick TbFeCo layer as a first recording layer, a 10-Å thick SiN film as an intermediate layer, a 100-Å thick TbFeCo layer as a second recording layer, a 300-Å thick SiN layer as a protective layer, and a 600-Å thick Al layer as a reflective layer were sequentially formed to obtain a magnetooptical recording medium with a structure shown in FIG. 20C.

The composition of the GdFeCo reproduction layer was set to have a compensation temperature of 290° C. and a Curie temperature of 380° C. or higher.

The composition of the TbFeCo first recording layer was set to have a compensation temperature of 180° C. and a Curie temperature of 200° C.

The composition of the TbFeCo second recording layer was set so that the second recording layer was TM rich at room temperature (the compensation temperature is equal to or lower than room temperature), and had a Curie temperature of 180° C.

Table 3 shows the measurement results.

(EXPERIMENTAL EXAMPLE 14)

A magnetooptical recording medium was prepared by forming thin films on a polycarbonate substrate using the same film formation apparatus and the film formation method as those in Experimental Example 10, and was evaluated under the same condition.

A 780-Å thick SiN layer as a dielectric layer, a 200-Å thick GdFeCo layer as a reproduction layer, a 51-Å thick TbFeCo layer as a first recording layer, a 20-Å thick SiN film as an intermediate layer, a 150-Å thick TbFeCo layer as a second recording layer, a 300-Å thick SiN layer as a protective layer, and a 600-Å thick Al layer as a reflective layer were sequentially formed to obtain a magnetooptical recording medium with a structure shown in FIG. 20C.

The composition of the GdFeCo reproduction layer was set to have a compensation temperature of 270° C. and a Curie temperature of 320° C. or higher.

The composition of the TbFeCo first recording layer was set to have a compensation temperature of 180° C. and a Curie temperature of 200° C.

The composition of the TbFeCo second recording layer was set so that the second recording layer was TM rich at room temperature (the compensation temperature is equal to or lower than room temperature), and had a Curie temperature of 180° C.

Table 3 shows the measurement results.

(EXPERIMENTAL EXAMPLE 15)

A magnetooptical recording medium was prepared by forming thin films on a polycarbonate substrate using the same film formation apparatus and the film formation method as those in Experimental Example 11, and was evaluated under the same condition.

A 1,000-Å thick SiN layer as a dielectric layer, a 150-Å thick GdFeCo layer as a reproduction layer, a 47-Å thick TbFeCo layer as a first recording layer, a 10-Å thick SiN film as an intermediate layer, a 60-Å thick TbFeCo layer as a second recording layer, a 300-Å thick SiN layer as a protective layer, and a 600-Å thick Al layer as a reflective layer were sequentially formed to obtain a magnetooptical recording medium with a structure shown in FIG. 20C.

The composition of the GdFeCo reproduction layer was set to have a compensation temperature of 285° C. and a Curie temperature of 350° C. or higher.

The composition of the TbFeCo first recording layer was set to have a compensation temperature of 180° C. and a Curie temperature of 200° C.

The composition of the TbFeCO second recording layer was set so that the second recording layer was TM rich at room temperature (the compensation temperature is equal to or lower than room temperature), and had a Curie temperature of 180° C.

Table 3 shows the measurement results.

(COMPARATIVE EXPERIMENTAL EXAMPLE 3)

A magnetooptical recording medium was prepared by forming thin films on a polycarbonate substrate using the same film formation apparatus and the film formation method as those in Experimental Example 10, and was evaluated under the same condition.

An 850-Å thick SiN layer as a dielectric layer, an 800-Å thick TbFeCo layer as a recording layer, and a 700-Å thick SiN layer as a protective layer were sequentially formed to prepare a magnetooptical recording medium.

The composition of the TbFeCo recording layer was set so that the recording layer was RE rich at room temperature, had no compensation temperature and had a Curie temperature of 200° C.

Table 3 shows the measurement results.

(COMPARATIVE EXPERIMENTAL EXAMPLE 4)

A magnetooptical recording medium was prepared by forming thin films on a polycarbonate substrate using the same film formation apparatus and the film formation method as those in Experimental Example 10, and was evaluated under the same condition.

An 850-Å thick SiN layer as a dielectric layer, a 400-Å thick GdFeCo layer as a reproduction layer, a 400-Å thick TbFeCo layer as a recording layer, and a 700-Å thick SiN layer as a protective layer were sequentially formed to prepare a magnetooptical recording medium.

The composition of the GdFeCo reproduction layer was set so that the reproduction layer was TM rich at room temperature (the compensation temperature is equal to or lower than room temperature), and had a Curie temperature of 360° C.

The composition of the TbFeCo recording layer was set so that the recording layer was RE rich at room temperature, had no compensation temperature and had a Curie temperature of 190° C.

Table 3 shows the measurement results.

TABLE 3

| | | C/N Value (dB) | | | | | | | |
|---|---|---|---|---|---|---|---|---|---|
| f (MHz) | d (μm) | E10 | E11 | E12 | E13 | E14 | E15 | CE3 | CE4 |
| 15 | 0.30 | 26 | 28 | 30 | 32 | 34 | 35 | 8 | 15 |
| 12 | 0.38 | 37 | 38 | 38 | 37 | 38 | 38 | 12 | 22 |
| 10 | 0.45 | 42 | 42 | 43 | 43 | 43 | 43 | 30 | 35 |
| 8.0 | 0.57 | 44 | 44 | 44 | 44 | 44 | 44 | 42 | 42 |
| 5.8 | 0.78 | 48 | 48 | 48 | 48 | 48 | 48 | 48 | 48 |

(f: recording frequency, d: recorded mark length, E: experimental example, CE: comparative experimental example)

What is claimed is:

1. A rewritable magnetooptical recording medium comprising:

a reproduction layer;

a first recording layer in which information is stored;

a second recording layer in which said information is stored; and a cutting-off layer arranged between said first and second recording layers, wherein sub-lattice magnetic moments of the same kinds of elements in said first and second recording layers are always oriented in opposite directions at room temperature and at a rising temperature above room temperature, said cutting-off layer consists of a material selected from the group consisting of an inorganic non-magnetic material, and a magnetic material which has a small perpendicular magnetic anisotropy or has a larger longitudinal magnetic component than a perpendicular magnetic component with respect to a substrate surface, and said cutting-off layer satisfies:

$$\sigma w/2Ms_1h_1 < H1 \text{ and } \sigma w/2Ms_2 < H2$$

where $Ms_1$ is the saturation magnetization of said first recording layer, $h_1$ is the film thickness of said first recording layer, H1 is the coercive force of said first recording layer, $Ms_2$ is the saturation magnetization of said second recording layer, $h_2$ is the film thickness of said second recording layer, H2 is the coercive force of said second recording layer, and $\sigma w$ is the magnetic wall energy which appears between said first and second recording layers via said cutting-off layer.

2. A medium according to claim 1, wherein each of the layers consists of a rare earth-transition metal amorphous alloy.

3. A medium according to claim 1, wherein said reproduction layer is a longitudinal magnetic film at room temperature and becomes a perpendicular magnetic film when a temperature rises.

4. A medium according to claim 1, further comprising:

an intermediate layer arranged between said reproduction layer and said first recording layer, and wherein a Curie temperature of said intermediate layer is higher than room temperature and is lower than Curie temperatures of said reproduction layer, said first recording layer, and said second recording layer.

5. An information reproduction method for reproducing information recorded on a rewritable magnetooptical recording medium which comprises at least a reproduction layer, a first recording layer on which information is stored, and a second recording layer in which information is stored on a substrate and a cutting-off layer arranged between said first and second recording layers, and in which sub-lattice magnetic moments of the same kinds of elements in said first and second recording layers are always oriented in opposite directions at room temperature and at a rising temperature above room temperature, said cutting-off layer consists of a material selected from the group consisting of an inorganic non-magnetic material, and a magnetic material which has a small perpendicular magnetic anisotropy or has a larger longitudinal magnetic component than a perpendicular magnetic component with respect to a substrate surface, and said cutting-off layer satisfies:

$$\sigma w/2Ms_1h_1 < H1 \text{ and } \sigma w/2Ms_2h_2 < H2$$

where $Ms_1$ is the saturation magnetization of said first recording layer, $h_1$ is the film thickness of said first recording layer, H1 is the coercive force of said first recording layer, $Ms_2$ is the saturation magnetization of said second recording layer, $h_2$ is the film thickness of said second recording layer, H2 is the coercive force of said second recording layer, and $\sigma w$ is the magnetic wall energy which appears between said first and second recording layers via said cutting-off layer, said method comprising:

the step of irradiating said medium with a light beam to orient a direction of magnetization of said reproduction layer in a direction that is stable with respect to a direction of magnetization of said first recording layer by an exchange coupling effect in only a local region in the irradiated portion; and the step of reproducing the information by detecting a magnetooptical change in light reflected by said medium.

6. A method according to claim 5, wherein the magnetooptical effect is a Kerr effect.

7. A method according to claim 5, further comprising:

the step of applying a reproduction magnetic field to the irradiated portion; and the step of applying an initialization magnetic field to a portion other than the irradiated portion, wherein the orientation step includes the step of orienting the direction of magnetization of said reproduction layer in the stable direction with respect to magnetization of said first recording layer by the exchange coupling effect in a region at a temperature not less than a middle temperature in the irradiated portion, and orienting the direction of magnetization of said reproduction layer in a direction of the initialization magnetic field in a low-temperature region.

8. A method according to claim 5, further comprising:

the step of applying a reproduction magnetic field to the irradiated portion; and the step of applying an initialization magnetic field to a portion other than the irradiated portion, wherein the orientation step includes the step of orienting the direction of magnetization of said reproduction layer in a direction of the reproduction magnetic field in a high-temperature region in the irradiated portion, orienting the direction of magnetization of said reproduction layer in the stable direction with respect to magnetization of said first recording layer by the exchange coupling effect in a middle-temperature region, and orienting the direction of magnetization of said reproduction layer in a direction of the initialization magnetic field in a low-temperature region.

9. A method according to claim 8, wherein the direction of the reproduction magnetic field is opposite to the direction of the initialization magnetic field.

10. A method according to claim 5, further comprising:

the step of applying a reproduction magnetic field to the irradiated portion, wherein the orientation step includes the step of orienting the direction of magnetization of said reproduction layer in a direction of the reproduction magnetic field in a high-temperature region in the irradiated portion, and orienting the direction of magnetization of said reproduction layer in the stable direction with respect to magnetization of said first recording layer by the exchange coupling effect in a low-temperature region.

11. A method according to claim 5, wherein said reproduction layer is a magnetic layer which is a longitudinal magnetic film at room temperature and becomes a perpendicular magnetic film when a temperature rises, and the orientation step includes the step of converting a magnetization state of said reproduction layer in a local region in the irradiated portion into the perpendicular magnetic film, and orienting a direction of magnetization of the portion converted into the perpendicular magnetic film in the stable direction with respect to the magnetization of the first recording layer by the exchange coupling effect.

* * * * *

UNITED STATES PATENT AND TRADEMARK OFFICE
CERTIFICATE OF CORRECTION

PATENT NO. : 5,719,829

DATED : February 17, 1998

INVENTOR(S): NAOKI NISHIMURA

Page 1 of 3

It is certified that error appears in the above-identified patent and that said Letters Patent is hereby corrected as shown below:

On the title page
[63] Related U.S. Application Data
    "Continuation of Ser. No. 333,319, Nov. 1, 1994, abandoned" should read --Continuation of Ser. No. 333,319, Nov. 1, 1994, abandoned, which is a continuation-in-part-of Ser. No. 111,974, Aug. 26, 1993, abandoned.--

[30] Foreign Application Priority Data
    Please add:  --Mar. 4, 1993 [JP] Japan...5-043786.--

[56] References Cited

FOREIGN PATENT DOCUMENTS

"4313833    11/1992    Japan" should read
--4-313833    11/1992    Japan--; and
    "5342677 3/1994 Japan" should read --5-342677 3/1994 Japan--.

COLUMN 1:

Lines 6-7, "This application is a continuation of application Ser. No. 08/333,319, filed Nov. 1, 1994, now abandoned." should read --This application is a continuation of application Ser. No. 08/333,319, filed Nov. 1, 1994, now abandoned, which is a continuation-in-part of Ser. No. 111,974, filed August 26, 1993, now abandoned.--.

UNITED STATES PATENT AND TRADEMARK OFFICE
CERTIFICATE OF CORRECTION

PATENT NO. : 5,719,829

DATED : February 17, 1998

INVENTOR(S): NAOKI NISHIMURA

It is certified that error appears in the above-identified patent and that said Letters Patent is hereby corrected as shown below:

COLUMN 9:

Line 3, "w" should read --σw--.

COLUMN 19:

Line 31, "ow" should read --σw--.
    Line 46, "ow" should read --σw--.

COLUMN 22:

Line 61, "al" should read --Al--.

COLUMN 23:

Line 22, "20-Å" should read --a 20-Å--.

UNITED STATES PATENT AND TRADEMARK OFFICE
CERTIFICATE OF CORRECTION

PATENT NO. : 5,719,829
DATED : February 17, 1998
INVENTOR(S) : NAOKI NISHIMURA

It is certified that error appears in the above-identified patent and that said Letters Patent is hereby corrected as shown below:

<u>COLUMN 31</u>:

Line 16, "$\sigma w/2Ms_2 < H2$" should read --$\sigma w/2Ms_2 h_2 < H2$--.

Signed and Sealed this

Seventh Day of March, 2000

Q. TODD DICKINSON

*Attest:*

*Attesting Officer*   *Commissioner of Patents and Trademarks*